United States Patent [19]
Blumenthal

[11] Patent Number: 6,026,409
[45] Date of Patent: Feb. 15, 2000

[54] SYSTEM AND METHOD FOR SEARCH AND RETRIEVAL OF DIGITAL INFORMATION BY MAKING AND SCALED VIEWING

[76] Inventor: Joshua O. Blumenthal, 53 Hill Rd., Suite 109, Belmont, Mass. 02178

[21] Appl. No.: 08/721,568

[22] Filed: Sep. 26, 1996

[51] Int. Cl.[7] .................................................. G06F 17/21
[52] U.S. Cl. .................................. 707/104; 707/3; 707/4; 707/528; 345/186; 345/332; 345/341; 345/431; 345/432
[58] Field of Search .................................. 707/3, 104, 4, 707/528; 345/431, 332, 340, 145, 432, 341, 186

[56] References Cited

U.S. PATENT DOCUMENTS

| | | | |
|---|---|---|---|
| 5,303,361 | 4/1994 | Colwell et al. | 707/4 |
| 5,479,303 | 12/1995 | Suzuki et al. | 360/72.2 |
| 5,515,488 | 5/1996 | Hoppe et al. | 345/440 |
| 5,546,529 | 8/1996 | Bowers et al. | 345/348 |
| 5,550,966 | 8/1996 | Drake et al. | 707/104 |
| 5,555,408 | 9/1996 | Fujisawa et al. | 707/5 |
| 5,557,794 | 9/1996 | Matsunaga et al. | |
| 5,586,316 | 12/1996 | Tanaka et al. | 707/4 |
| 5,603,034 | 2/1997 | Swanson | 395/701 |
| 5,659,742 | 8/1997 | Beattie et al. | 707/104 |
| 5,696,916 | 12/1997 | Yamazaki et al. | 395/356 |
| 5,867,678 | 2/1999 | Amro et al. | 345/347 |

OTHER PUBLICATIONS

Cowart, R., "Mastering Windows 3.1, Special Edition.", pp. 104–129, 150–162, 1993.

Computer file: DEXTER.EXE (Requires Windows95). See 3½ floppy (Submitted Paper 10), No Date, Anonymous.

Brian Johnson, et al., "6.3 Treemaps: A space–filling approach to the visualization of hierarchical information structures," Proc. of the 2nd International IEEE Visualization Conference: San Diego, Section 6, pp. 284–291, Oct, 1991.

Christopher Ahlberg, et al., "Dynamic Queries for Information Exploration: An Implementation and Evaluation," Department of Computer Science Human–Computer Interaction Laboratory: University of Maryland.

Christopher Williamson, et al., "The Dynamic HomeFinder: Evaluating Dynamic Queries in a Real–Estate Information Exploration System," Human–Computer Interaction Laboratory Center for Automation Research and Computer Science Department: University of Maryland.

Stephen G. Eick, et al., "Visualizing Code Profiling Line Oriented Statistics" Visualization '92, The IEEE Computer Society Press: Boston Massachusetts, pp. 210–217, Oct. 19–23, 1992.

Stephen G. Eick, et al., "Seesoft—A Tool for Visualizing Line Oriented Software Statistics" IEEE Transactions on Software Engineering, IEEE Computer Society: vol. 18, No. 11, pp. 957–968, Nov. 1992.

Stephen G. Eick, et al., "Graphical Analysis of Computer Log Files," Communications of the ACM, vol. 37, No. 12, pp. 50–56, Dec. 1994.

Donald A. Zaremba "Adding a Data Visualization Tool to DECFUSE," Digital Technical Journal: vol. 7, No. 2, 1995.

Rowe A. Lawrence, et al., "A Visual Shell Interface to a Database," Software Practice & Experience: vol. 19, No. 6, pp. 515–528, Jun. 1989.

*Primary Examiner*—Jean R. Homere
*Attorney, Agent, or Firm*—Morgan & Finnegan, LLP

[57] ABSTRACT

The invention comprises a visual search and retrieval system and method. At least one viewing window is provided on a screen. The viewing window has a first and second pane. The first pane provides a global view of digitally stored information and the second pane provides a local view of the digitally stored information. The first pane has first indicia which indicate results of a search performed by a user and the second pane has a second indicia which also indicate the results of the search performed by the user. The second indicia corresponds substantially to the first indicia.

54 Claims, 26 Drawing Sheets

Microfiche Appendix Included
(6 Microfiche, 547 Pages)

1500

SYSTEM AND METHOD FOR SEARCH AND RETRIEVAL OF DIGITAL INFORMATION BY MAKING AND SCALED VIEWING

REFERENCE TO MICROFICHE APPENDIX

Incorporated herein is an appendix consisting of microfiche sheets and 547. The microfiche appendix is the source code used for an embodiment of the present invention. The program is in the C++ language and may be compiled for execution with Borland C++, version 5.0, or greater, compiler.

BACKGROUND OF THE INVENTION

1. Field of the Invention

This invention relates to a system and method for searching digitally stored information.

More particularly, the invention relates to a system and method for searching for and retrieving the information and then displaying the information in a form which is easy for a user to study.

2. Description of the Related Art

Various computer programs for searching digitally stored data on a computer system are known. In addition, there are also computer programs which display the data retrieved as a result of a search. These include, for example, search engines, find features, data visualization programs, and visual search applications.

Search Engines

Computer programs are known that search and retrieve documents relevant to a query submitted by a computer user on a single computer system and on computer systems networked to that individual's computer. These programs are commonly known as "search engines" and may be found on the Internet, in digital catalog systems in libraries, and other very large data repositories.

Search engines generally employ the following parts:

1) a pre-compiled index of the data repository being searched, allowing for greater search performance with respect to both speed and storage size;
2) a user/query interface which is an interface to accept the query input of the user and decipher (or parse) that query;
3) one or more search mechanisms or algorithms which are used to search the pre-compiled index; and
4) an output or display interface which is a mechanism to represent the results of a user's search.

The power of a search engine is its ability to seemingly extract documents relevant to a query from a global scope of information. This power can vary greatly, depending on the level of sophistication of the parts listed above. The search sophistication of search engines typically corresponds to the complexity of their creation.

Boolean, statistical, metric, or conceptual based search methodologies are the most popular, due to the greater success rates of these methods over others in assessing the target information desired by a user.

Once a search has been invoked and completed, the most common method for the ordering and display of relevant documents is in a relevancy sorted bibliographic listing. A bibliographic listing lists the most relevant documents and may also contain two or three lines of excerpt, abstract or other associated information which may be, for example, extracted from the retrieved document, or a citation to the point within the document thought to contain the relevant information, or the line numbers on which a queried keyword appears within the document. More sophisticated search engines can additionally display such listings as "hyper-links" which associate passages in one document with another document which can be displayed when the "link" is clicked on with a mouse.

To attain meaningful search results, search engines generally require the user to have at least some knowledge of how to formulate proper queries, and others require a detailed understanding of complex query languages. Such query languages may be difficult for new users to grasp and usually take some time to master. As a result, alternative search engines have been designed which simplify the process of creating queries by allowing queries to be formulated in seemingly "natural language." The trade-off is that the parsing mechanism (the mechanism responsible for processing and deciphering the query) is significantly more complex than standard Boolean or statistical keyword query parsers. Additionally, the complex nature of a query parsing mechanism almost always prohibits the mechanism, and therefore the search engine, from being used with foreign languages, unless substantial additional programming is provided.

As noted above, many search engines require a pre-compiled index of the repository being searched. As the information in the repository is added to or changed the index may need to be updated. This generally means that the complete search process cannot be accomplished in real-time, due to the time consuming nature of compiling the index. This may present a serious impediment to searching large amounts of real-time data.

By design, most search engines return and display a listing of documents in response to a query. When searching a large data repository the search engine may return a list of hundreds or even thousands of relevant documents. Even if the user knows that the returned listing shows the documents with the greatest chance of satisfying the query, the user probably has no comprehensive way of easily determining the density or accuracy of this information. The result is that the ability to easily analyze information within the retrieved documents is often lost, and the user must browse all the returned information, or even each document, in order to ascertain the location and relevancy of the information returned in response to the query. This usually proves to be a very time consuming process.

Furthermore, the user is subject to the ambiguities inherent in a search engine's algorithmic logic. As a result, the information sought may not necessarily be the information searched for, or the format of the desired query may not be allowed.

Find Feature or Command

"Find" features or commands may be found, for example, in computer programs commonly dealing with organized data such as word processors, spreadsheets, and databases. A "find" feature or command is generally a program or routine which searches and retrieves information from within a document that matches a keyword based query submitted by a user of the program. Typically, find features employ the following parts:

1) a user/query interface, which functions to accept the query input of the user and decipher the query;
2) one or more search mechanisms which generally employ syntactic pattern matching algorithms or semantic (i.e. a spreadsheet formula) pattern recognition algorithms; and
3) an output/display interface which presents the results of a user search (this is usually just the document itself).

As contrasted with search engines, find features do not usually require a document to be indexed. This allows for a complete search process to be accomplished in real-time, even on constantly changing data. More sophisticated find features may employ the use of case, partial word, and homonym matching. Results of "find" type searches are generally returned by "jumping" to the location of the match and highlighting or flagging it in some manner. These search mechanisms are characterized by their speed as well as their simple creation process and ease of use.

Find features found within common applications typically provide a bare minimum of searching capability and are inadequate for serious search analysis.

First, the scope of these algorithms typically does not extend beyond the bounds of the document.

Second, these algorithms are usually limited to simple, single keyword or phrase based searches.

In other words, there is an inability to: specify complex or compound queries, search for multiple topics at once, or broaden the scope of the mechanism beyond the current document or group of pre-identified documents.

Though both search engines and find features are standard in their respective areas, they are generally cryptic in their nature and do not employ the use of immediately intuitive input or output interfaces.

As proven within the data visualization field, the use of visual cues or indicators has been generally acknowledged as significantly more intuitive for data analysis and extraction. However, neither search engines nor find features typically make use of visual cues to any great extent.

Data Visualizers

In an attempt to address the limitations of the foregoing, computer programs have been created which make use of visual cues to extract information contained in one or more documents. One example of such an application, is Seesoft (described in Eich, Steffen, & Summer, *Seesoft: A Tool for Visualizing Line Oriented Software Statistics*, IEEE Transactions on Software Engineering, 1992, pgs. 957–968), which may be used to find information about computer programming files. It relies heavily on a multiple phase process. First it obtains the desired information in a statistical form. This is accomplished by running computer programs on the "target" files which accumulate statistics about the desired information. The values extracted from a file or files are grouped together into a single set of data, referred to as a "data set." These data sets are static and contain the statistical values as well as corresponding information of which lines of text, and within which files, the statistics occurred. The data set is then fed into a program commonly referred to as a data visualizer. Typically, the data visualizer creates a "thumbnail" view of the documents being analyzed and color codes the lines associated with pieces of data in the data set. This application primarily uses color to represent the range of values associated with a statistic.

A further example of a data visualization application is a visualization tool within DEC Fuse, which is a commercially available product from Digital Equipment Corp. This visualization tool makes use of multiple data sets. Instead of having a range of values represented by different colors, each data set is represented by a different color.

One problem with using data visualization mechanisms with information searches is that they usually require indexes, i.e. data sets, to color code information within the data visualizer which, like the indexes used with search engines, have to be pre-compiled by other applications. Thus, as with search engines, if the source files are changed, the current data sets are no longer applicable. In other words, if the source files are changed the user must go through the process of creating new data sets. Therefore, because of the static nature of a data set these applications suffer from similar drawbacks as search engines in that there is no ability to act on continuously changing information.

Furthermore, although the user may have a choice regarding which data sets are visualized, and in what color, these applications generally lack intuitive user interfaces. There is typically no ability to interact with the visualized data, or interface, with the express purpose of creating new data sets.

Most importantly, the data sets are also an integral component to the process, although they are separate components. This means that if a data set or index is corrupted, lost, or changed, the capacity to find information is destroyed and the user must restart the data collection and visualization process again.

Visual Search Application

Computer programs have also been written which allow for visual searching, at a given time, within a single document. Like the data visualizers mentioned above, the applications use a method of marking points of interest within a single file on a representation of that file, which is typically displayed as a thumbnail view (i.e., in reduced size) on the user's screen. Unlike the standard data visualizers discussed above, this application integrates a "find" feature or command as discussed above with the ability to visualize the results. It also allows a user to decide, to some extent, what information is shown within the thumbnail representation of the document.

In particular, the application allows a user to interact with a full scale representation of the document, which is shown in a separate window from the thumbnail view, to create queries (and delete them after creation). The results of the queries can then be represented both in the full scale view and the thumbnail or reduced size view of the document. For example, a user can choose a word to be searched by clicking on that word in the full scale view of the document thereby associating a color with that word. In response, the system highlights all occurrences of the selected word in the document. This highlighting appears on the user's screen both in the full scale representation of the document and in the thumbnail representation of the document. Colors of the users choosing (among a selection of six colors) may be associated with the queried words for visualizing the representations in a meaningful manner.

A drawback to this application is that it only has the capability to look at a single document at a time, for each copy of the program running on the user's computer. In other words, to view two documents, two copies of the application must be running. Unlike the data visualizers mentioned above, which had the ability to handle multiple files within one global thumbnail view and within a single program framework, for a user to compare multiple files using the visual search application, the user must open a new copy of the application for each file to be compared or searched.

An additional drawback to the visual search application is that it makes poor use of random access memory ("RAM"). For example, it is estimated that for the application to process a document which has a size of X kilobytes, the application requires an amount of RAM equal to approximately 25 times X. This is due to the creation of a memory index of all words in the document which is placed in RAM.

Referring to FIG. 12A, the memory structure 1202 for the visual search application is shown. In memory, for each word in the document, the application stores the word itself 1204 and the word's corresponding color 1206. Additionally, it stores substantial amounts of additional information 1208, 1209 pertaining to the word. This additional information 1208, 1209 is part of the data structure

1202 for each word. Indeed, although FIG. 12A has been illustrated with 2 "blocks" of additional information 1208, 1209, the prior art device actually stored substantially more than two blocks. Finally, the data structure 1202 contains a pointer 1210 to the data structure 1212 of the next word 1214 in the document. This all causes each word within the document to have a very large memory "footprint" when the document is loaded into the application. Additionally these color representations are only stored with the word once when the user initially queries a word. Therefore, the application is not capable of handling dynamic source information (or information which is constantly changing in real-time).

In the visual search application, queries are saved in a data file which is not part of the original document and, as a result, there is nothing to prevent the data file from being separated from the original document. Since, when the document is retrieved by the user in a later session, the application must use both files (the document and the data file) to retain the color coded information, if the document and data file become separated the user must go through the query process all over again.

Furthermore, the user interface of the visual search application does not have a single coherent standard for interaction with the document being analyzed. The interface is also typically non-intuitive and may be confusing to many users. Necessary interface components for window navigation such as scrolling and window labeling (for easy window differentiation) may also be lacking. This visual search application is also unsuitable for handling media other than simple text.

Therefore, it would be desirable to be able to provide a dynamic visual search and retrieval system and method for digital data which is useable with multiple documents of differing media, which contains a consistent, easy to use querying interface in which queries may be formulated and executed, and in which the results may be retrieved visually and in real-time.

It would also be desirable to have a system and method for visual search and retrieval with the ability to submit multiple queries so that they can be categorized in real-time by the user, be combined visually so they (the queries) may be interpreted by the user as (or to simulate) Boolean, statistical, and conceptual bodies of information.

It would also be desirable to be able to provide in such a system a method for user navigation, and user demarcations of points of interest within the retrieved material.

SUMMARY OF THE INVENTION

The invention comprises a visual search and retrieval system and method. At least one viewing window is provided on a screen. The viewing window has a first and second pane. The first pane provides a global view of digitally stored information and the second pane provides a local view of the digitally stored information. The first pane has first indicia which indicate results of a search performed by a user and the second pane has a second indicia which also indicate the results of the search performed by the user. The second indicia correspond substantially to the first indicia.

Another aspect of the system further has third indicia viewable in the first pane. The third indicia indicate substantially the local view provided by the second indicia. The second indicia may be presented in color and the colors may match when they correspond to the same search result.

Another aspect of the invention comprises a method with the following steps of: displaying a global view of a digitally stored information in a first pane of a viewing window, displaying a local view of the digitally stored information in a second pane of the viewing window; provision a query submitted by a user to obtain a search result; and displaying the search result responsive to the query in the first and second panes with a first colored indicia.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

The above and other advantages of the invention will be apparent upon consideration of the following detailed description, taken in conjunction with accompanying drawing(s), in which like reference characters refer to like parts throughout, and in which.

DETAILED DESCRIPTION

This invention comprises a system and method for the visual search and retrieval of digital information within a single document or multiple documents. The documents themselves can be of differing media or differing media may be part of one or more individual documents. The documents may be found on a single computer and/or on computers connected via networks. The system and method employs a consistent, easy to use, interactive visual querying mechanism. Simple queries may be submitted by a user, via a mouse click or typing a keyword at a prompt, and preferably categorized and be retrieved and viewed on a display as distinct highlights by using different colors. The distinct highlights may also appear in their respective categorical colors, on a variable scale map representation of the documents being searched, in real-time.

The results or highlights may be combined visually and interpreted by the user as, or used to simulate, Boolean, statistical, and conceptual bodies of information. The system and method may be applied to media capable of being represented digitally, for example, text, spreadsheets, databases, graphics, audio, video, and virtual environments depicted in three dimensions, alone or in combination.

The invention also provides a system and method for user navigation and user demarcation of points of interest within the retrieved material. The system operates using relatively little memory on an average personal computer, without the use of document indexes, regardless of the size of the document or documents being searched. This is accomplished by maintaining a database of the queries submitted by the user which is utilized when displaying search results.

A computer system, having a visual display and running a graphical user interface based operating system, or window based operating system, is provided. Information search and retrieval application programs may run on the system and results are retrieved within one or many documents on a single computer system or on many computer systems scattered over one or more computer networks.

Figure 1:
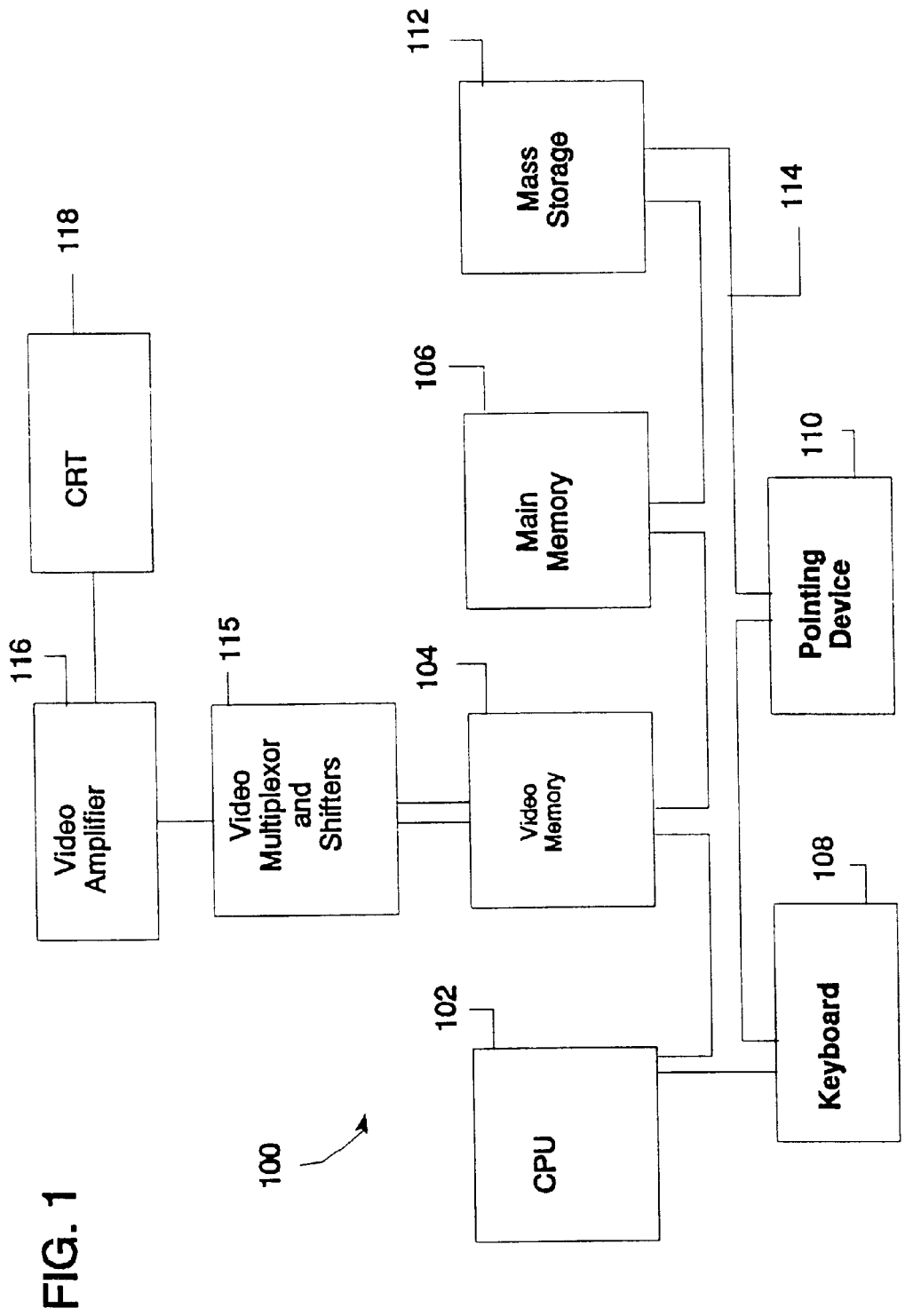
FIG. 1 is a block diagram of an exemplary hardware configuration on which the system and method of the invention may be implemented.

While the present invention may advantageously be implemented on nearly any conventional computer system utilizing any operating system supporting graphics, an exemplary computer system 100 on which the present invention may be implemented is shown in FIG. 1. FIG. 1 shows a preferred embodiment of a hardware system 100 implementing the present invention as part of a computer system. In FIG. 1, the system 100 includes central processing unit ("CPU") 102, video memory 104, main memory 106, a keyboard 108, a pointing device 110, and mass storage 112.

The keyboard 108 is used for user input. User input may also be accomplished by, or supplemented with, the pointing device 110, which can be a conventional mouse, track ball, joy stick, touch pad, eye tracking device, touch screen or other pointing device capable of conveying user input to the system 100. When the term "mouse" or "pointing device" is used herein, it should be understood that any of these devices may be used. The keyboard 108 and pointing device 110 can be used to manipulate graphic images according to the present invention.

The mass storage 112 may include for example, fixed or removable media using one or more of electro-mechanical, magnetic, optical, or magneto-optical storage technology. It will of course be recognized that, in the computer art, new mass storage technologies are routinely in development. Accordingly, any other mass storage technology capable of storing digital data may also be used in connection with the invention.

These components are interconnected via a conventional bi-directional system bus 114. System bus 114 contains 32 address lines for addressing information in video memory 104 and main memory 106. System bus 114 also includes a 32 bit data bus for transferring data between and among CPU 102, video memory 104, main memory 106, and mass storage 112. In the preferred embodiment of system 100, CPU 102 is an Intel Pentium 32-bit microprocessor, but any other suitable computer may alternatively be used. In addition, it will be understood that larger, smaller or uni-directional busses may also be used.

In a preferred embodiment, main memory 106 of system 100 comprises sixteen megabytes ("MB") of conventional dynamic random access memory ("RAM"). It will also be understood that, depending upon the particular system design, more or less memory may be used without departing from the invention. Similarly, video memory 104 comprises two megabytes of conventional dual-ported video random access memory. Again, depending on the system, applications and resolution desired, more or less video memory may be used. Connected to a port of video memory 104 is video multiplex and shifter circuitry 115. A video amplifier 116 is connected to the video multiplex and shifter circuitry 115. The video amplifier 116 drives the monitor 118 which, in a preferred embodiment is either cathode ray tube ("CRT") color monitor, dual-scan color display or active matrix color display. Again, other displays suitable for displaying color images may be used. Video multiplex and shifter circuitry 115 and video amplifier 116, which are conventional, convert pixel data stored in video memory 104 to signals suitable for displaying graphic images having a resolution of 1200 pixels wide by 1024 pixels high. It will also be understood that, depending upon the display, other resolutions, larger or smaller in viewing area, may be used.

The user interface and operating system used in the preferred embodiment is the interface provided by the Windows 95 32-bit operating system, available from Microsoft Corporation. Of course, any other suitable operating system and windowing interface, from Microsoft Corporation or any other company, may alternatively be used. Additionally, since the windows environment is well known, only those aspects necessary for an understanding of the invention are described.

Figure 2:
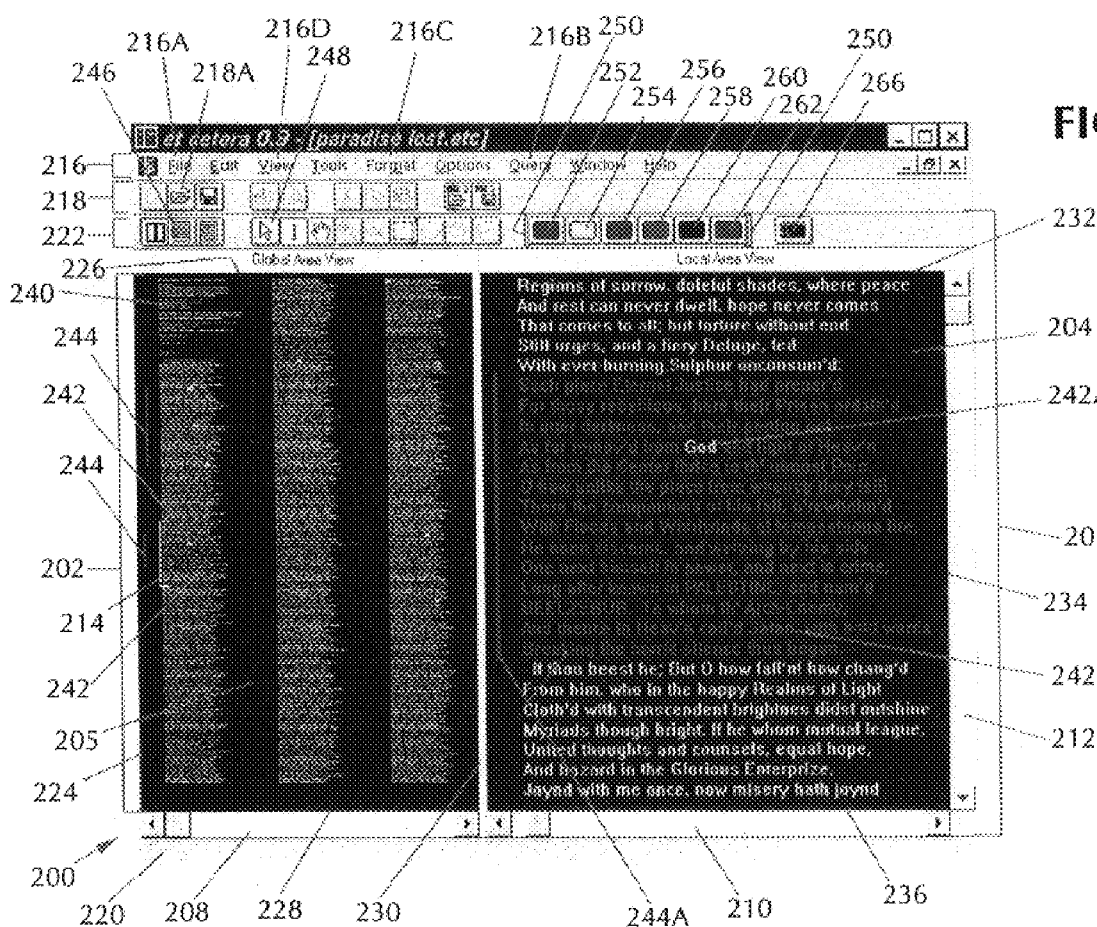
FIG. 2 is a representation of a portion of a computer display showing various regions defined thereon according to the present invention.

With respect to the user interface of a preferred embodiment, FIG. 2 shows a Main Application window 200 of the visual searching application program focusing on a single document. Within this window 200 is another window 201 for viewing the results of a document search. This window 201 is called the Viewing window. Preferably the program's default setting provides two viewing areas, created as two panes within the window 201. The two panes are called the global area view ("GAV") 202 and the local area view ("LAV") 204. The GAV 202 is an area where the document being searched is viewed in miniature scale. The term "global" indicates that the user is viewing a great or "global" amount of information in one area (i.e. a "global view"). This is also referred to as a "thumbnail" view. The LAV 204 represents actual (original form) data "local" to each document.

The two panes, GAV 202 and LAV 204, may be varied in display field size so that, in most instances, the document displayed in GAV 202 will be smaller than original size and the document displayed in LAV 204 is typically larger in size than that displayed in GAV 202.

In one embodiment, the scale (magnification factor) of the documents within the GAV 202 are reduced in size and, as most preferred, may vary from about 1%–50%, inclusive, of the original document size. In this embodiment if the scaled document in the GAV 202 is too long to fit vertically in the GAV, the document can be "wrapped" to a new column as shown in FIG. 2.

Alternatively, in another embodiment, each document within the GAV 202 could be forced to occupy its own individual column, similar to the manner in which columns of a spreadsheet are laid out, with any portion of each document which does not fit within the pane being obscured from view. In that case, for documents in the GAV 202 extending beyond the height of the pane, a vertical scroll bar may be provided. The user could then scroll down the columns to view additional text.

For documents extending beyond the width of the pane a horizontal scroll bar 208 is provided.

Before describing the details of performing a search, an overview description of the screens in the window 201 and their role in the invention is provided by way of illustration.

When a user enters a query by selecting a keyword in the LAV 204, the word is highlighted in a selected color in the LAV. For example, in FIG. 2, the word "God" 242A has been selected and is colored yellow. In addition, all other instances of that word are highlighted in the same chosen color in the LAV and in the GAV 202 (see 242, yellow marking). In this manner, a user can identify in the GAV (through a document map 205) areas of concentration of selected search terms. The user may select various colors for various search terms using buttons 250, thereby allowing a detailed and specific study of the document map 205 in the GAV 202. To further the example of FIG. 2, a user can select a second color, red, and choose to color the word "Satan" red 242A. Corresponding matches of the word are shown on the document map 205 as red highlights (see 242, red).

The default setting of the LAV 204 is set to represent the original size of the document being analyzed, though in an alternative embodiment, the scale of the LAV 204 may be varied from between about 51%–400% of the original document size. As in the GAV 202, in the LAV 204, for data extending beyond the boundaries of the pane, horizontal 210 and vertical 212 scroll bars are provided as needed. At any time, the scale setting (magnification factor) of both the GAV 202 and LAV 204 may be changed to a value within the previously specified approximate limitations.

Within the GAV 202 is a bracket or brace, known as the Zoombox 214, which corresponds to the precise location and size of the information within the LAV 204. The Zoombox 214 has mobility within the GAV 202. The Zoombox can be moved with use of the pointing device 110 as described below. As the Zoombox 214 is moved, the LAV 204 is updated to represent the respective information outlined by the Zoombox 214. Additionally, as the LAV 204 is scrolled vertically or horizontally, the Zoombox 214 moves to represent the corresponding contextual position of the LAV within the document. It should be understood that even though the Zoombox is illustrated in FIG. 2 as a bracket, it could be implemented as a box or other shape which completely encloses the matter in the GAV 202 corresponding to the material shown in the LAV 204.

The Main Application window 200 contains a menu bar 216. The menu bar 216 allows the user to select actions to be performed via various menu commands. Also in the window 200 is an Application Button Bar 218 which allows commands to be executed by pressing various buttons. Finally, the window also contains a Message Bar 220 where messages about the application are displayed.

A user opens a Viewing Window 201 (GAV 202, LAV 204, and tool bar 222) by using the "Open" command under the File Menu 216a or the Open Document Button 218a on the application button bar 218. Each Viewing Window 201 contains its own button bar, known as the Tool Bar 222. The Viewing Window 201 also contains the two window panes GAV 202, and LAV 204 described above. The GAV 202 has boundaries 224, 226, 228, and 230. The LAV 204 also has boundaries 230 (which it shares with the GAV 202), 232, 234 and 236).

Since pull-down menus, menu bars, button bars and tool bars are each commonly used in windows based applications, and are well known, it will be recognized that the particular use of one method over another is a matter of convenience.

The contents of the GAV 202 includes the Documents Map 205 and the Zoombox 214. The Documents Map 205 is made up of Micro-text (also referred to as Micro-text Columns) 240, Matches 242 and Excerpts 244. Any of these features contained within the Documents Map 205, may or may not, be displayed at any one time as is described below.

The Micro-text 240 is the thumbnail view of the text found within the document. The text is therefore in reduced size and, depending upon the size, may be shown as readable text, "greeked" text, or lines. Matches 242 are color coded highlights or indicia within the Micro-text 240 representing the results of a user query. That is, a Match 242 in the Document Map 205 corresponds in color to a Match 242A in the LAV 202. The Match 242A in the LAV occurs when a user enters a query as described below.

Excerpts 244 are indicators or indicia used to mark user-selected points of interest with a color. This is a manual tool which does not depend on the results of any query, but instead on a user's whim. In the GAV 202, excerpts 244 are not simply represented as reduced scale highlighted bodies of text, but instead are displayed as reduced verticle markings within the left margins of the microtext columns, so as not to obstruct the display of any Matches 242. It should be noted that in other embodiments for languages other than English, or because of a user preference, the excerpt markings 244 may be appropriately placed in the right, top, or bottom margin or combinations thereof. An Excerpt 244 in the Document Map 205 corresponds in color to an Excerpt 244A in the LAV 204. When two or more Excerpts overlap, the overlapping portions of the text are displayed in white while the margin markings are displayed in their respective colors.

Should the collections of documents being searched be so large that the Micro-text columns extend beyond the boundaries of the GAV 202, the user has four options. The user may extend the right boundary 230 of the GAV 202 as with conventional windows application by placing the mouse cursor over the boundary 230 and dragging the boundary to the right until the desired setting is reached. As a second choice, the user may scroll the Micro-text Columns 240 by using the scroll bar 208 at the bottom of the GAV 202. The third choice is for the user to alter the Viewing window to show only the GAV 202 and not the LAV 204. This can be done using the Tool Bar 222, which contains a split window button, a GAV Only Display button and a LAV Only Display button. By pressing the GAV Only Display Button 246 this is accomplished. The forth option is for the user to make the Documents Map 205 smaller by further reducing the width of the Micro-text desired column of text, the mouse cursor must be moved over the column.

The text within the LAV 204 is referred to as "Plain-text", which is the original scale text representation of the document. Like the Documents Map 205, the Plain-text may also contain Matches 242*a* and Excerpts 244*a*, except that they are original scale. The Plain-text may be scrolled like text within a word processor by using the scroll bars (vertical 212 and/or horizontal 210 when needed) within the LAV 204. As the Plain-text is scrolled, the Zoombox 214 within the GAV 204 moves to reflect the corresponding portion of the Documents Map 205 displayed as Plain-text within the LAV 204. The user may also choose to extend the left boundary 230 of the LAV 204 further to the left in order to view more of the Plain-text as described above.

Excerpts 244A are entered in the LAV 204 by first choosing the "Text Selection" button (which is located immediately to the right of the query arrow button 248 in FIG. 2). The cursor then turns to an "I-bar." The user places the I-bar over the piece of plain-text within the LAV 204 where the excerpting is to begin. The user clicks and holds the left mouse button and drags across the text to be excerpted. This highlights the text to be excerpted with a color inversion. The user then releases columns 240 within the GAV 202. This may be accomplished by choosing the "Global Area" command under the "Format" menu 216C, and inputting a greater column width.

Within the GAV 202, the Zoombox 214 is used to navigate the Documents Map 205 and delineate the exact location and context of the text currently displayed with the LAV 204. To move the Zoombox 214 the user must select the Arrow Button 248 from the Tool Bar 222. Navigation occurs by the user choosing any destination point within the Documents Map 205, placing the mouse cursor on that point and clicking the left mouse button on that point. This results in the Zoombox 214 "jumping" to the location clicked within the Documents Map 205, while the corresponding information is displayed within the LAV 204. Additionally, the Zoombox 214 may be "dragged" within the Documents Map 205, as conventionally done in windows-type applications, by clicking the left mouse button and holding it down while moving the mouse around. The resulting effect is that the Zoombox 214 follows the mouse actions until the user lets go of the left mouse button. In a preferred embodiment, when dealing with text, the Zoombox 214 will stay "attached" to the Micro-text column that is closest to the mouse cursor (represented as an arrow). In order to make the Zoombox 214 move to the the left mouse button and chooses a color from the color selection button group 250. The selected text is colored in the chosen color and an excerpt bar of the same color is placed in the left margin 244A.

Figure 7:
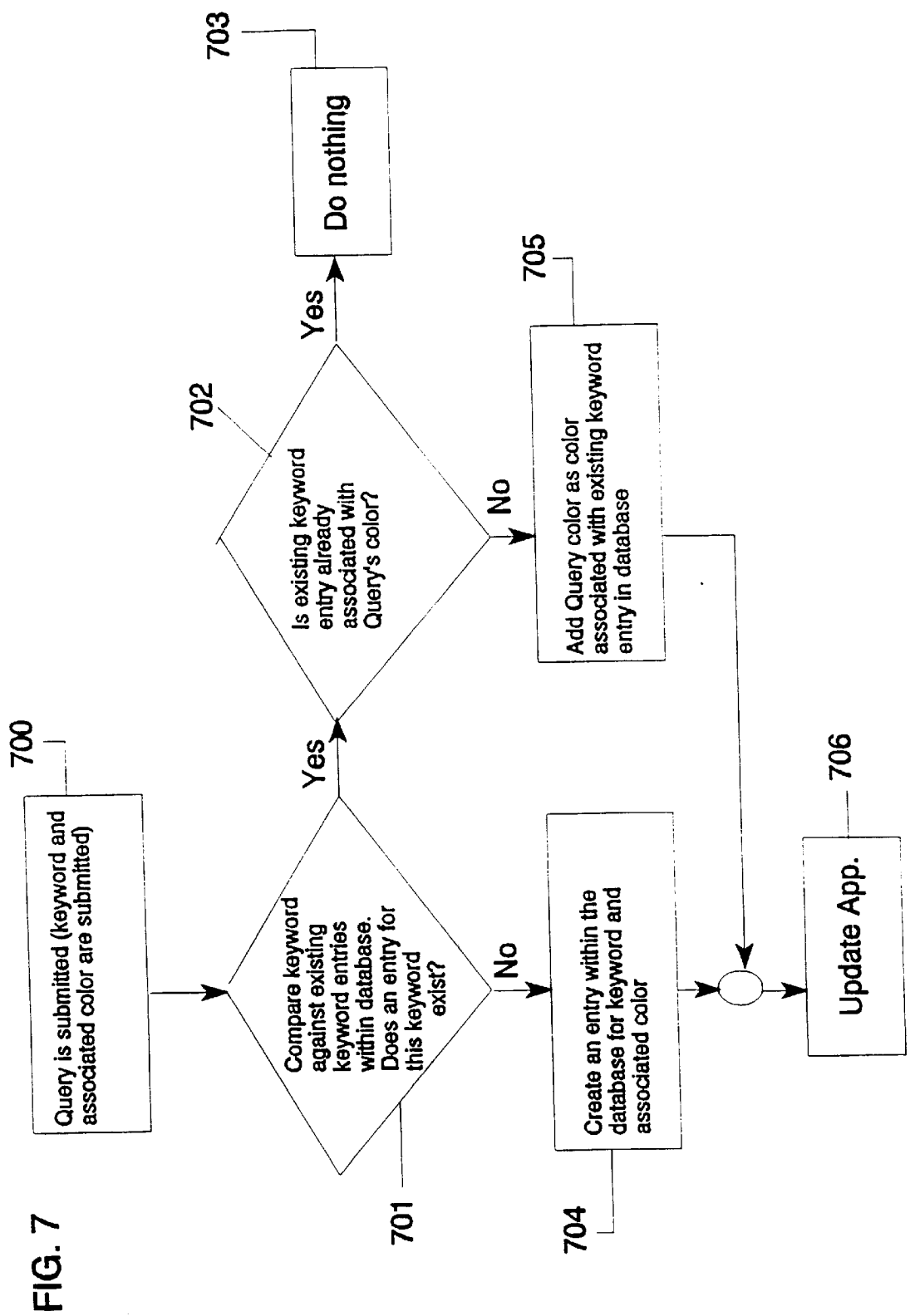
FIG. 7 is a flow diagram of a portion of a process implemented by the system and method of the invention.

The user has various ways for submitting queries, for example by clicking an instance of the keyword (e.g. "God" or "Satan" 242A) within the Plain-text or by typing the keyword into a dialog box. To submit a keyword from the Plain-text the user selects the Query Arrow 248 from the Tool Bar 222. This causes the default color button from the Color Selection Button Group 250, the red button 252, to become selected. If the user desires to categorize the query in a different color, this can be achieved through the selection of a different color button, for example, yellow button 254, green button 256, aqua button 258, blue button 260, or magenta button 262, from within the Color Selection Button Group 250. To perform the actual query, the user positions the Query Arrow cursor using the mouse so that it is superimposed on the desired keyword in the Plain-text and proceeds to click the left mouse button. Doing so causes a pre-submission color inversion of the keyword and the query color until the user releases the mouse button (see FIG. 3, "Beelzebub"). At this point, the process starting at step 700 as shown in FIG. 7 is invoked to handle submission.

Figure 3:
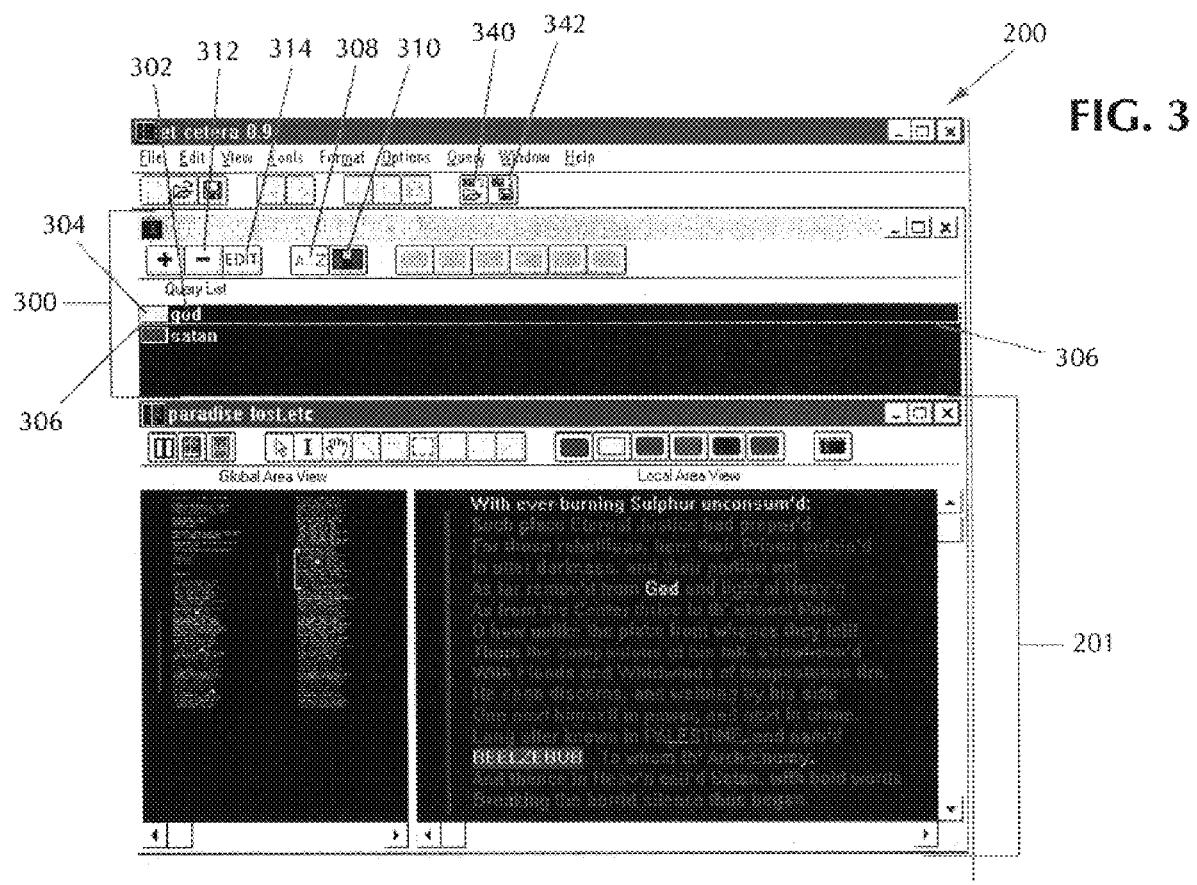
FIG. 3 is a representation of a portion of a computer display showing various regions defined thereon according to the present invention.

To view a list of all queries performed, with the Viewing window 201, the user may open a Query window 300 which is illustrated in FIG. 3. This is accomplished by pressing the Show Query Window Button 266 on the Tool Bar 222 (FIG. 2). Opening the Query window 300 may also be accomplished by choosing the "Show Query List" command from under the Query Menu 216*b* within the Main Application window 200.

Figure 4A:
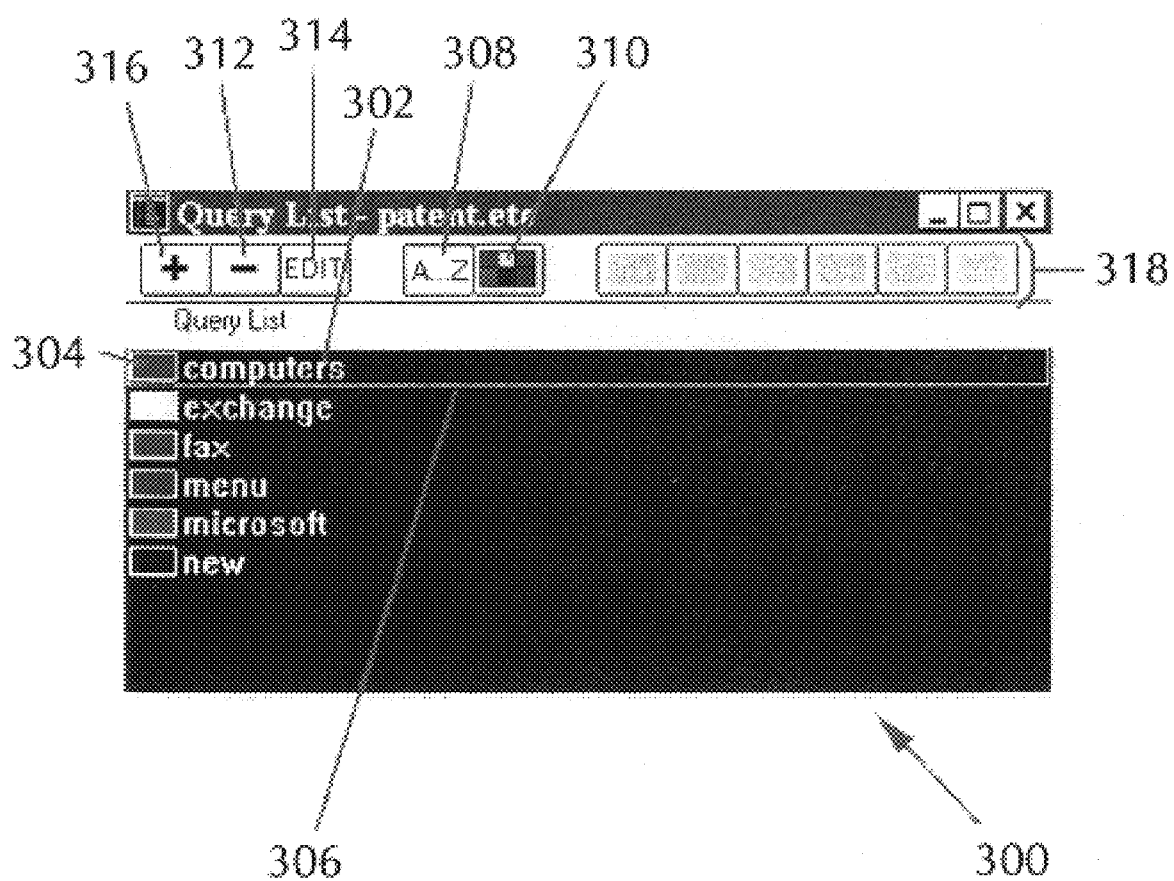
FIG. 4A is a representation of a portion of a computer display showing various regions defined thereon according to the present invention.
Figure 4B:
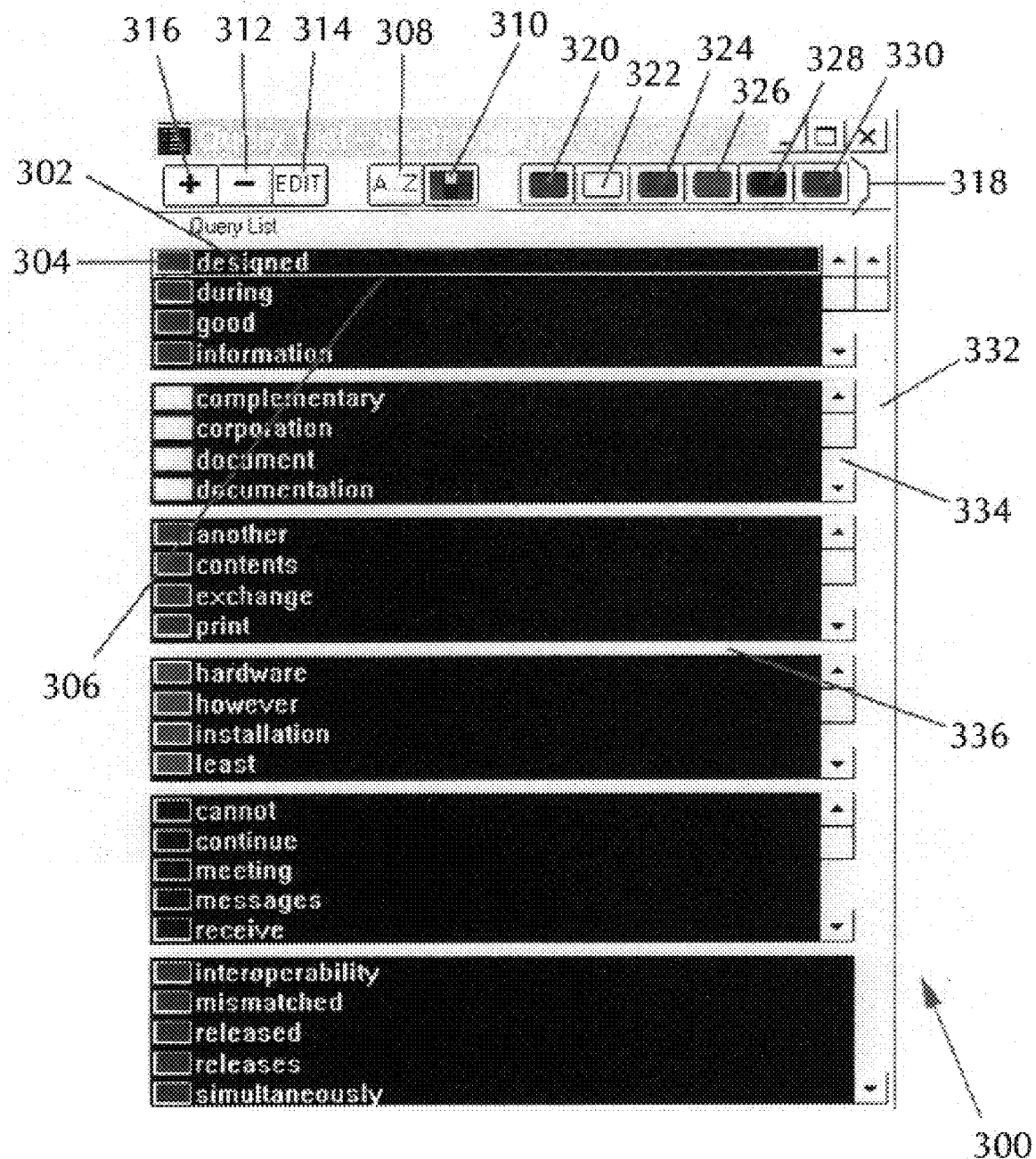
FIG. 4B is a representation of a portion of a computer display showing various regions defined thereon according to the present invention.

Referring to FIG. 3, the Query window 300 contains a listing of all the queried keywords 302 with their respective color categorization 304. The currently selected query is that query which is contained within the outline box 306. Additionally the queries may be sorted alphabetically or by their respective color categories. This action is accomplished via the Alphabetic Sort Button 308 or Color Sort Button 310. An Alphabetic Sort sorts alphanumerically whereas a Color Sort sorts according to color, with the first color selected being displayed first followed by each successive color selected being shown in the order in which the selection was made. FIG. 3 shows an alphabetic sort of the queries. This is also depicted in FIG. 4A which shows the Query Window 300 out of context with an alphabetic sort. FIG. 4B shows a color sort. As depicted, the sort order implies that the colors were selected, for viewing in the Query Window, from first to last: red, yellow, green, etc. This is accomplished by selecting the color to be displayed from the Color Selection Button Group 318 which provides buttons for the various colors 320, 322, 324, 326, 328 and 330. It should be noted that FIG. 3 depicts the Query window 300 in the Main window 200 along with the View window 201. In another embodiment, the Query window 300 could also be presented as a pane within the View window 201. If more queries than can vertically fit in the Query window 300 are present, a scroll bar 332 (FIG. 4B) is provided to scroll up and down through the queries. Referring to FIG. 4B, in color sort mode, each color is organized alphanumerically in its own window pane separated by pane dividers 336. Scroll bars 334 may be used to browse more information than can fit in the pane as appropriate.

Submission of queries via dialog box input occurs by pressing the "Plus" button 316 on the Query window 300 (FIGS. 3, 4A and 4B). When this button is pressed, a dialog box 500, as shown out of context in FIG. 5, will pop up, prompting the user to input the query (or queries) in a query entry area 502 and its corresponding color category 504 which, by way of example, has already been selected to be "Red". When the text of the query is entered, the user click's the "OK" button 506 within the dialog box. This invokes the process shown in FIG. 7, starting at step 700. The Documents Map 205 and the LAV will immediately thereafter update themselves to display the respective locations of the new query in its categorized color. This same action may also be performed by choosing the "Add Query" command under the Query menu 216*b* found on the Main Application Window 200 (FIG. 2).

Referring now to FIG. 7, the process for submitting a query will now be described. A query consists of a keyword and a color. In step 700, the query is submitted by the user. The query includes both the keyword and an associated color. Then, in step 701, the keyword is compared against existing keyword entries within the database. If an entry for the keyword already exists within the database, the system then determines whether the keyword entry is already associated with the query color in step 702. If the entry is already associated with the query color, in step 703, the system does nothing. If the existing keyword is not already associated with the query color, in step 705, the system adds the query color as a color associated with the existing keyword entry in the database. If, when comparing the keyword against existing keyword entries in the database in step 701, the system determines that there is not an entry for the keyword, in step 704, the system creates an entry within the database for the keyword and associated color. In step 706, the application is updated and all corresponding keywords are marked with the proper highlighted color. The application update process is discussed below with reference to FIG. 10.

Retraction of a query from within the Plain-text occurs in a manner similar to submission except the user clicks the right mouse button with the Query Arrow Cursor superimposed on the query to be retracted. This invokes the process starting at step 800 depicted in FIG. 8. Additionally, the Minus button 312 within the Query window 300 (FIGS. 3, 4A and 4B) deletes the currently selected query. This also invokes the process shown in FIG. 8 starting at step 800. The Documents Map 205 once again will update itself to display the remaining queries. Deleting a query may also be performed by choosing the "Remove Query" command under the Query menu 216b found on the Main Application window (FIG. 2). This will delete the currently selected query within the Query Window 300.

Figure 8:
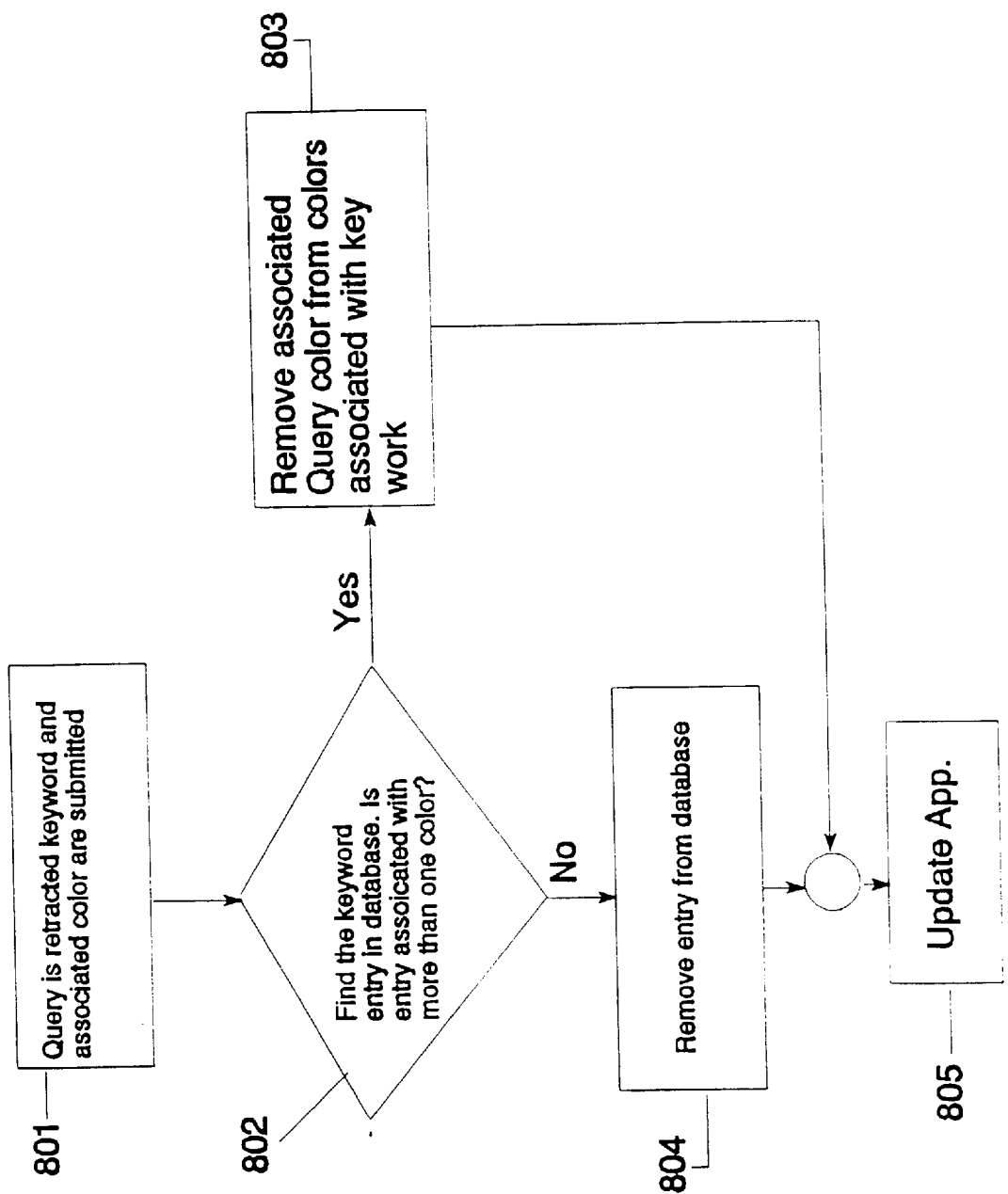
FIG. 8 is a flow diagram of a portion of a process implemented by the system and method of the invention.

Referring to FIG. 8 in step 801, the user decides to retract a query. In other words, the keyword and associated color are submitted to the system to be removed. In step 802, the system locates the keyword entry in the database and determines whether it is an entry associated with more than one color. If the entry is associated with more than one color, in step 803, the system removes the associated query color from the colors associated with that keyword. If the keyword entry in the database is not associated with more than one color, in step 804, the system removes the entry from the database altogether. In step 805, the application is updated as described with respect to FIG. 10.

The decision to retract a query in step 801 can be accomplished in different ways. If the user retracts the query by selecting a query (keyword and color) from the Query Window 300 and hitting the Minus button 312, the system knows exactly which color and keyword combination to delete. However, when a keyword has been queried with two or more associated different colors, the keyword is colored in white as is described below with reference to FIG. 10. If the user retracts a query by selecting with the pointing device a keyword which is colored white, the system preferably retracts the last selected associated query color. For example, if the user associated red with a selected word and then associated yellow with the same word, retraction using the pointing device would retract the associated yellow color first and the red color next. Alternatively, in another embodiment, the system could require that the user first select the color from the Color Selection Button Group 250. So, to retract a red query, the user must first click on the "red" button 252 and only then select the query to be retracted.

Figure 5:
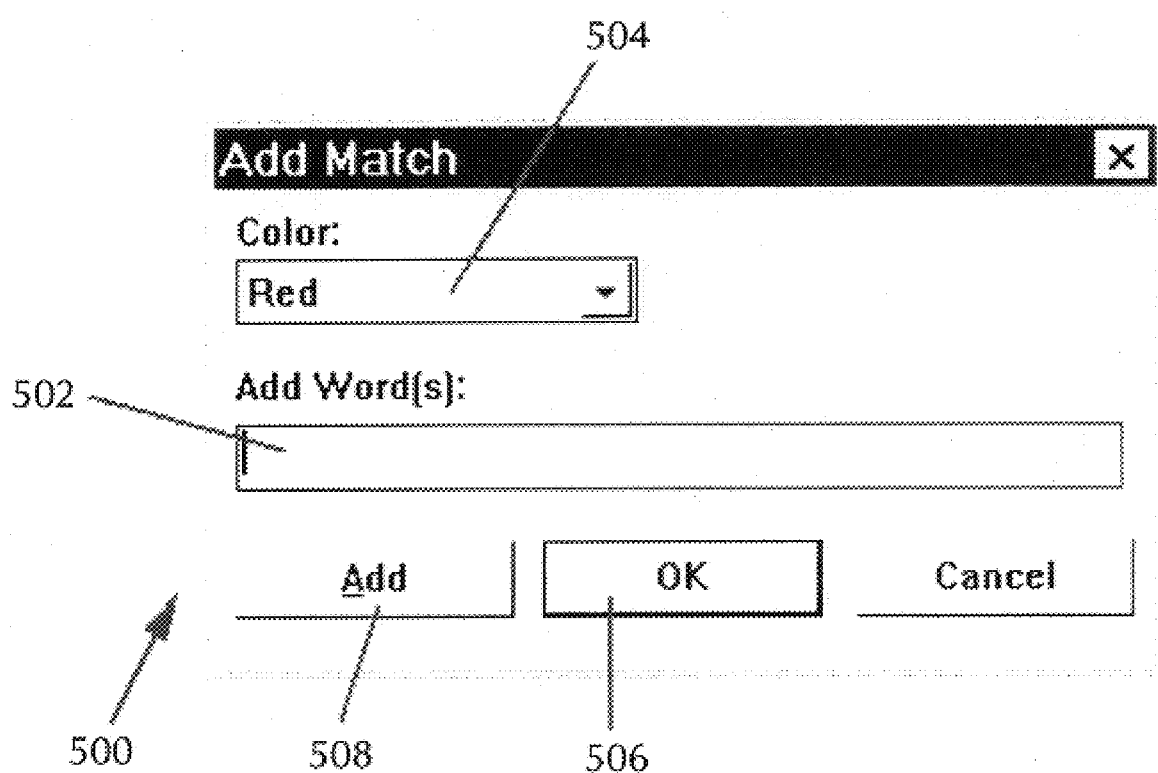
FIG. 5 is a representation of a portion of a computer display showing various regions defined thereon according to the present invention.

Editing of a query is performed by pressing the Edit button 314 within the Query window 300 (FIGS. 3, 4A, 5B). This action will pop up a dialog box similar to that shown in FIG. 5, except that the currently selected query within the Query window 300 will appear in the text edit field 502 of the dialog box. Also, the color will appear in the color field 504. The user may then manipulate the syntax of the query. Pressing the "OK" button 506 within the dialog box initiates the process starting at step 900 described in FIG. 9. Editing a query may also be performed by choosing the "Edit Query" command under the Query menu 216b found on the Main Application Window (FIG. 2). Editing a query is the automation of retracting an old query and submitting the newly edited query. This elimination of steps provides for greater ease of use and functionality.

Figure 9:
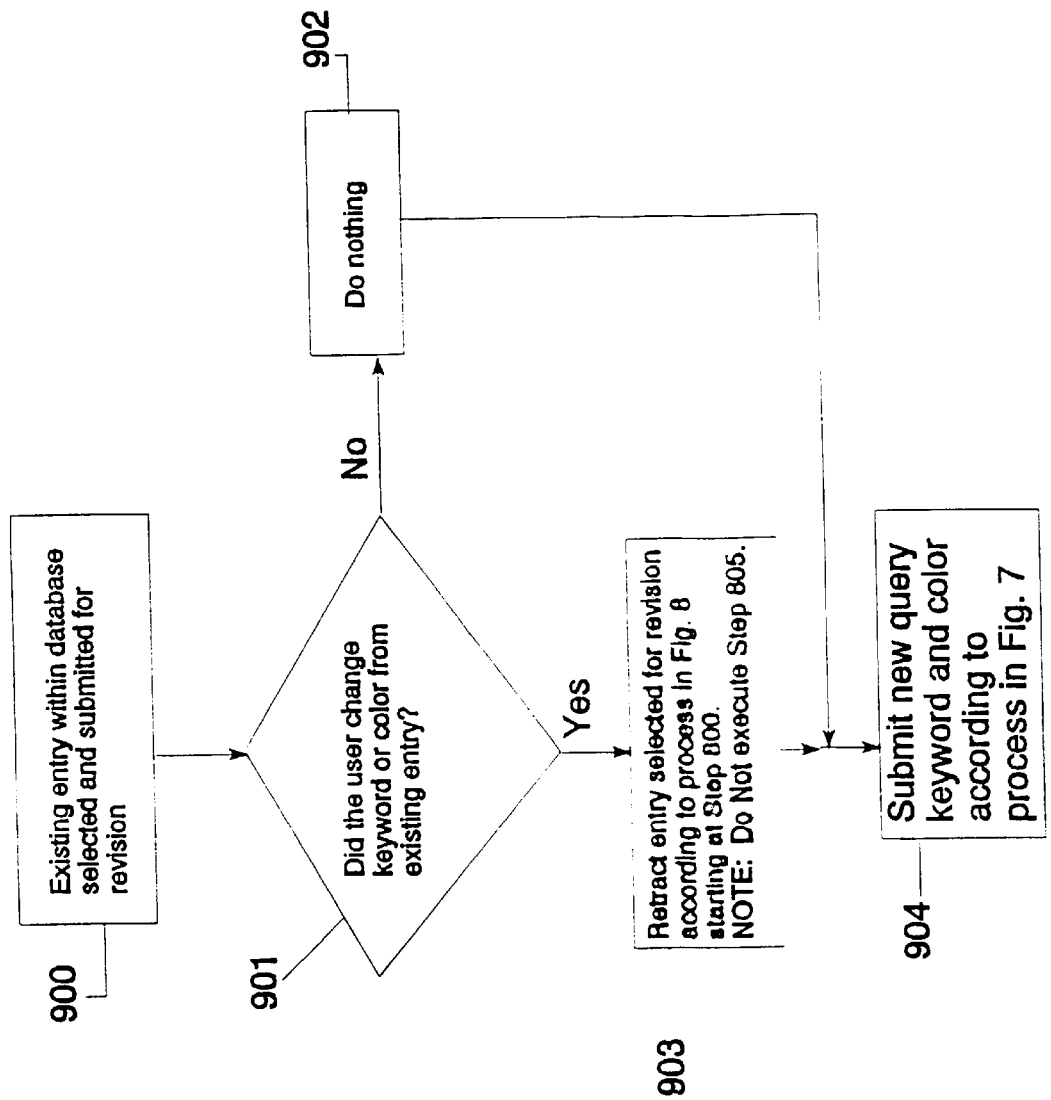
FIG. 9 is a flow diagram of a portion of a process implemented by the system and method of the invention.

Referring now to FIG. 9, when an existing entry within the database is selected and submitted for revision (step 900), the system first determines whether the user changed the keyword or color from an existing entry in step 901. If the user did not change the keyword or color from existing entry, the system in step 902 takes no action and the new query, keyword and color, according to the process illustrated in FIG. 7, is submitted to the system in step 904. If, in step 901, the user did change the keyword or color from an existing entry, the system retracts the entry selected for revision according to the process in FIG. 8 starting at step 800, except that step 805 is not performed. Then, in step 904, the system submits the new query (keyword and color) according to the process in FIG. 7.

As a result, in FIGS. 7, 8 and 9, the database is manipulated based on queries being submitted (FIG. 7), retracted (FIG. 8) and/or edited (FIG. 9). The database may be manipulated with any one or more of a combination of these processes. Once the database is manipulated, the application can update what is displayed on the screen using the process shown in FIG. 10. In summary, the process shown in FIG. 10, analyzes the database and, based on the contents of the database, updates the display screen which can then be viewed by the user.

Figure 10:
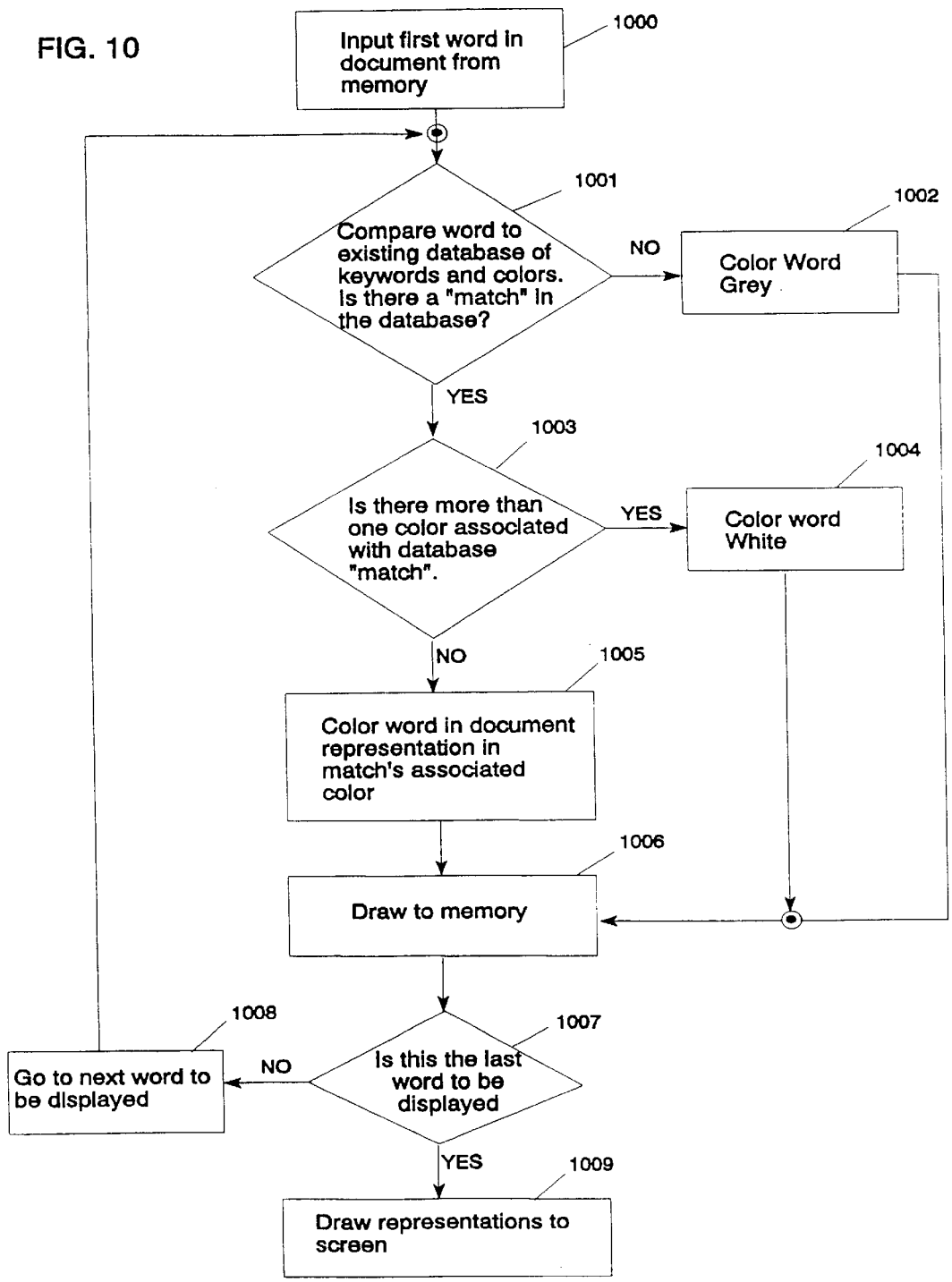
FIG. 10 is a flow diagram of a portion of a process implemented by the system and method of the invention.

Referring now to FIG. 10, the system inputs the first word from memory in step 1000. Next, the system compares the word to the database of keywords and colors (queries) in step 1001. If there is no match, in step 1002, the system colors the word in gray, on the display screen. This representative color of gray, indicates that the word is of no importance, i.e., that the word is not a result of a query. Alternatively, another color could be used to represent this. In step 1006, this coloring of the word gray is drawn to memory. If, in step 1001, there was a match in the database for the word input from the document cache, then the system determines whether more than one color was associated with the database match in step 1003. If more than one color was associated with the database match, in step 1004, the word is colored white. When a word is colored white, this indicates that there is an overlap of two or more queries. After the system colors the word white in step 1004, the result is stored to memory (also sometimes referred to as drawn to memory) in step 1006. If in step 1003, the system determines that there is not more than one color associated with the database match, in step 1005, the system colors the word in the document representation with the match's associated color. Then, in step 1006, the result is stored to memory.

After the results are stored to memory in step 1006, the system determines whether this is the last word to be displayed in step 1007. If this is the last word to be displayed, the representation is drawn from the data stored in memory to the screen in step 1009. If in step 1007, the system determines that this is not the last word to be displayed, the system goes to the next word to be displayed in step 1008. The system then loops back to step 1001 and the process as described above is repeated until the last word to be displayed has been processed in step 1007.

Figure 6A:
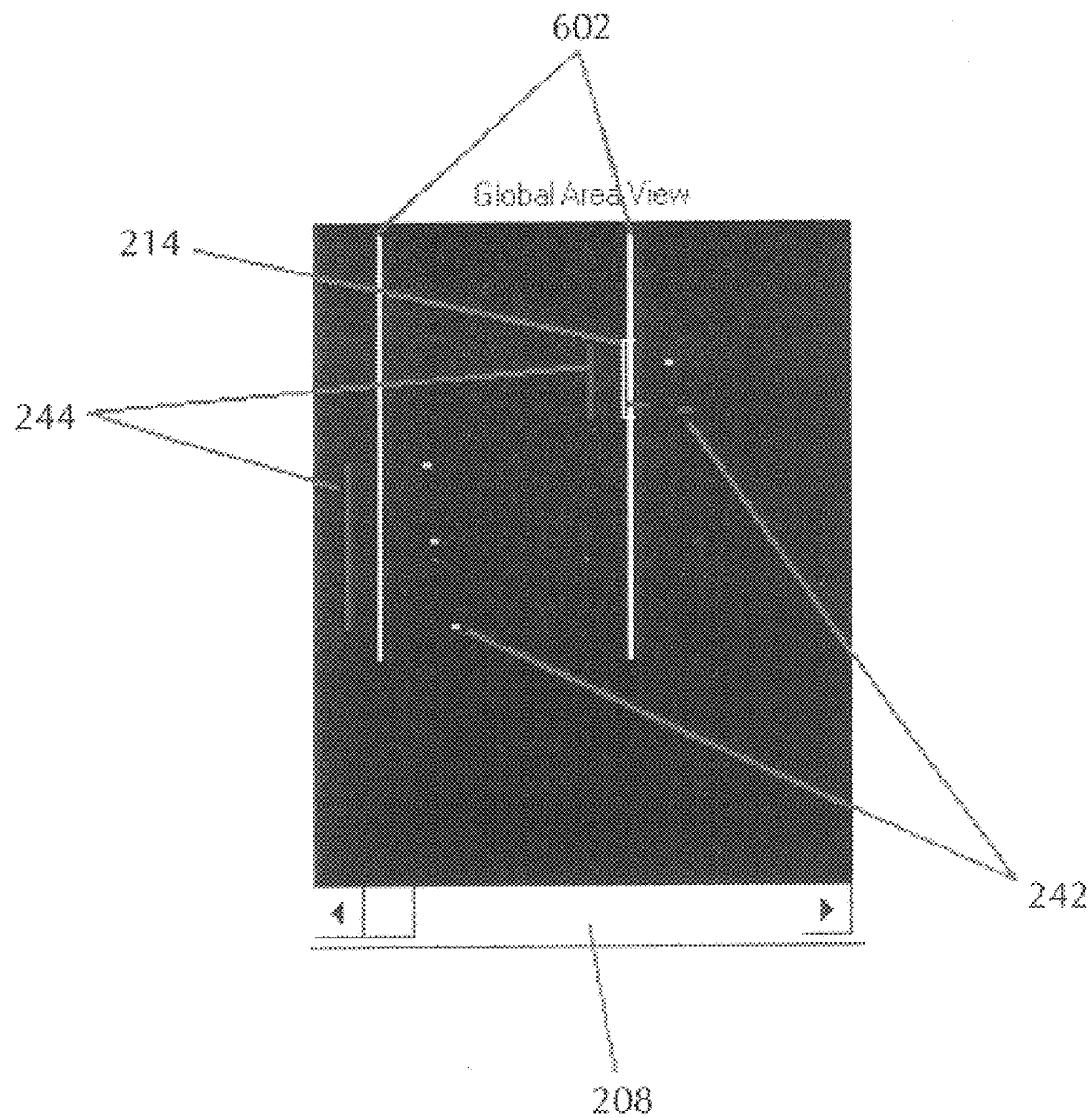
FIGS. 6A, 6B and 6C are representations of a portion of a computer display showing various regions defined thereon according to the present invention.
Figure 6B:
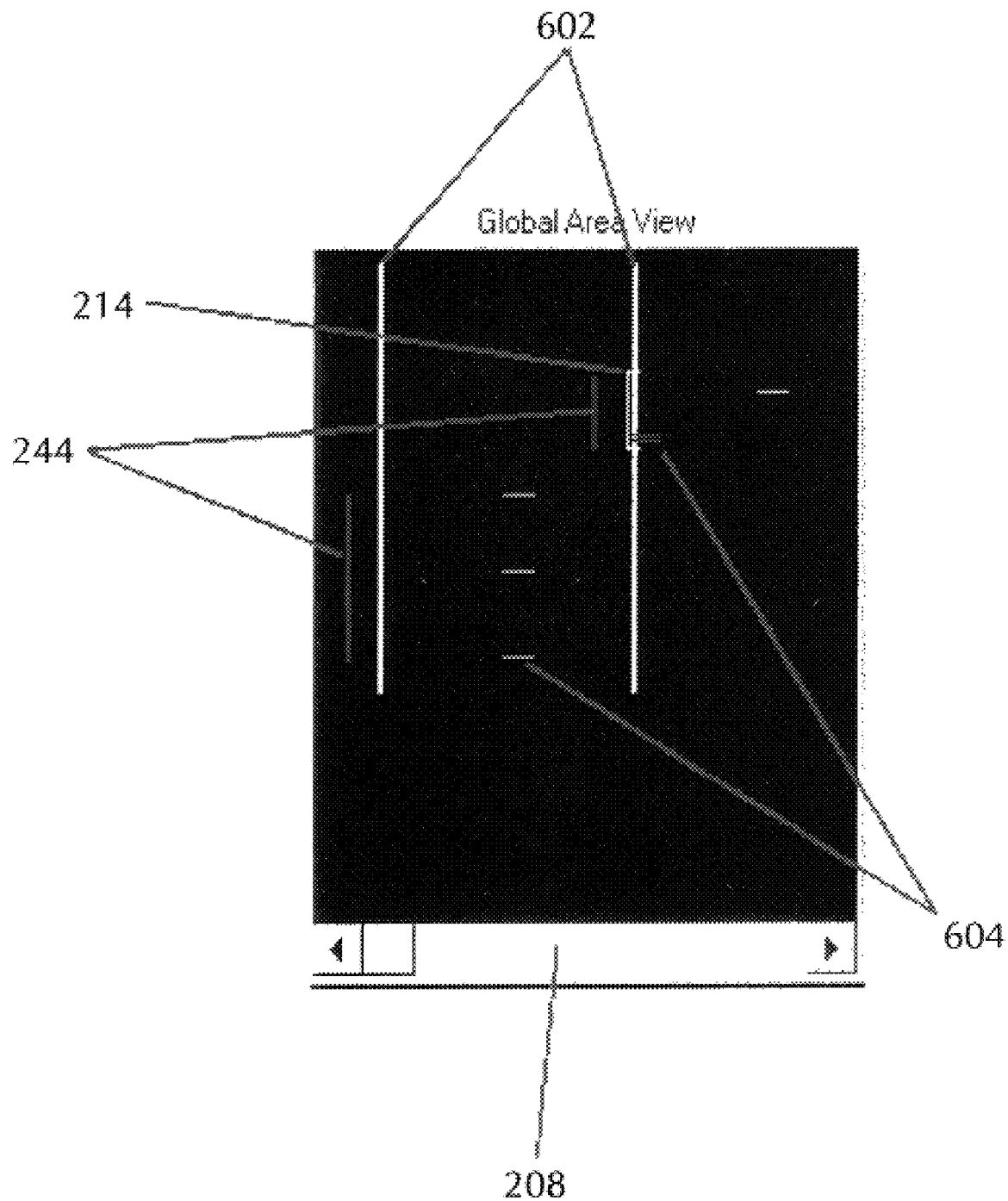
Figure 6C:
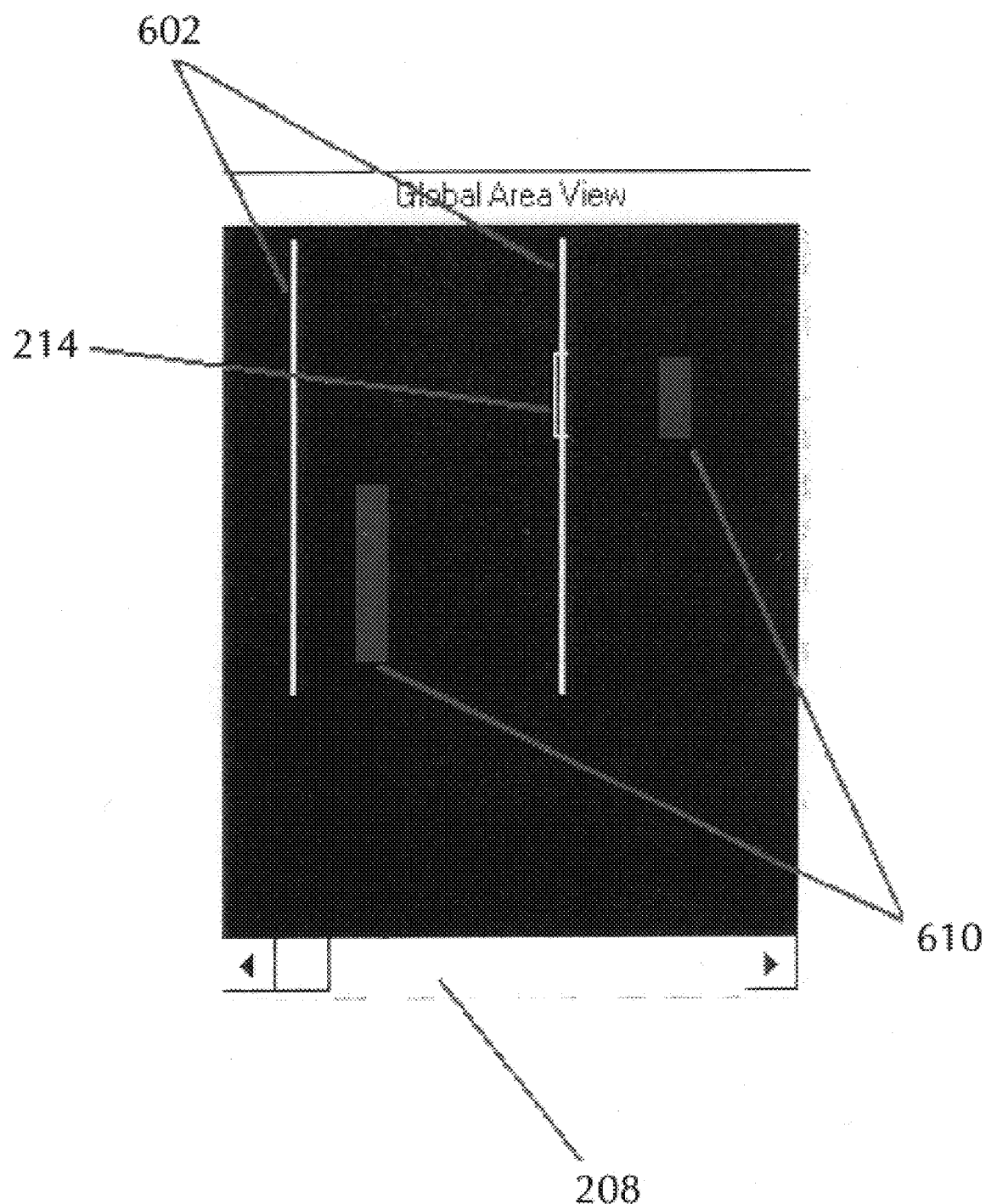

FIGS. 6A, 6B and 6C are diagrammatic representations of the application program showing the various manners in which the Documents Map 205 shown in FIG. 2 may be manipulated. Each of these manipulations is known as a "display state." Each display state focuses on the display of specific items contained within the Documents Map 205.

In FIG. 2 the application is set to the default ("normal") display state of the Documents Map 205 where all information: Micro-text 240, Matches 242, and Excerpts 244 are displayed. FIG. 6A is similar to the GAV 202 in FIG. 2 except that the underlying Micro-text is "hidden" (or not displayed), making the Matches 242 more visible. This display state includes column delineators 602 which indicate the left margin marker of the hidden Microtext. FIG. 6B illustrates the effect of a more abstract display state on the Documents Map 205, called "Queries Only". This allows the user to view the line markers 604 that indicate line locations of Matches but not their exact location within each line. In other words, the line marker 604 merely indicates which line a Match is on but not where (from a left and right perspective) the match is situated on the line. The line marker also indicates the associated color of the Match. This is a useful display state when there are a very large number of queries per category and locating points of interest becomes too difficult using the default display state. It is also useful to differentiate queries which "collide" or overlap. FIG. 6C is also an abstract display state designed to allow the user to view only the locations of excerpted text. With this display state, the system shows solid columns of color 610 indicating the color and line locations of excerpted text. It should be noted that these markings occur to the right of column delineators 602. The three display states shown in FIGS. 6A, 6B, and 6C can be invoked through menu commands. For the state shown in FIG. 6A, a user selects the Format menu 216C (FIG. 2) from the Menu bar 216, and selects "display." This brings up a dialog box which allows a user to choose, via "check boxes", whether microtext, queries, and excerpts are to be displayed. The states in FIGS. 6B and 6C are changed with the View menu 216D. The user selects the "Display State" submenu which provides the choices "Queries Only" and "Excerpts Only."

Figure 11A:
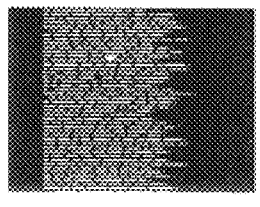
FIGS. 11A, 11B, 11C, 11D, and 11E are representations of portions of a computer display showing various regions defined thereon according to the present invention.
Figure 11B:
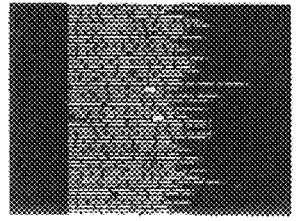
Figure 11C:
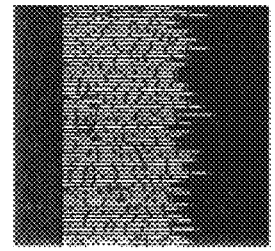
Figure 11D:
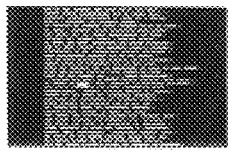
Figure 11E:
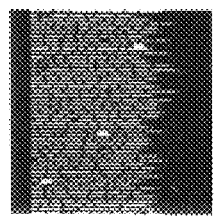

FIGS. 11A–E are diagrammatic representations of pieces of the Document Map 205 within the application program showing some of the different possible Boolean interpretations of two queried Matches 242, one in red and one in yellow, within the GAV 202. The Boolean operator "AND" is displayed by FIGS. 11A, 11B and 11D due to the close proximities of the red and yellow Matches 242 within these text sections. The Boolean operator "OR" is displayed by FIGS. 11A, 11B, 11C, 11D, and 11E, because all of these text sections display either the yellow or red Matches or both yellow and red matches. "Exclusive OR" is depicted in FIGS. 11C and 11E where yellow matches are displayed or red matches are displayed but not both. Boolean operator "NOT" would be displayed by FIG. 11C or FIG. 11E depending on which match, red, or yellow, is "NOT" desired in the text passage. Finally, "NEAR" is depicted in FIGs. 11B and 11D where red and yellow matches are shown within a line or two of each other. It is important to note that these visual interpretations of Boolean operators are dependent on the individual opinions of each user.

Additionally, statistical and conceptual computations such as how many times a word has occurred within a document, or how many times one word has occurred next to another word, or the general location of where topics within a document are discussed, etc., may also be calculated visually. In most mechanisms, after the user makes a determination about which queries will be used in a search, the search mechanism autonomously determines the results based on the user's queries. The present invention gives the user of the application program control over the results of the search by allowing the user to determine which bodies of data are displayed in detail within the LAV 204.

Figure 12A:
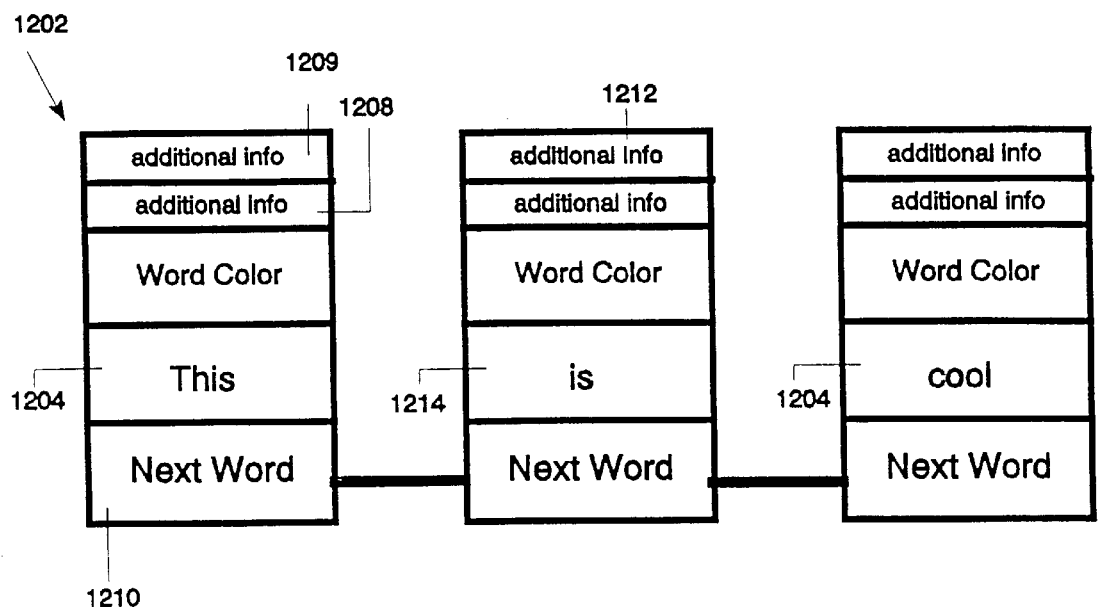
FIG. 12A is a representation of memory uses in the prior art.
Figure 12B:
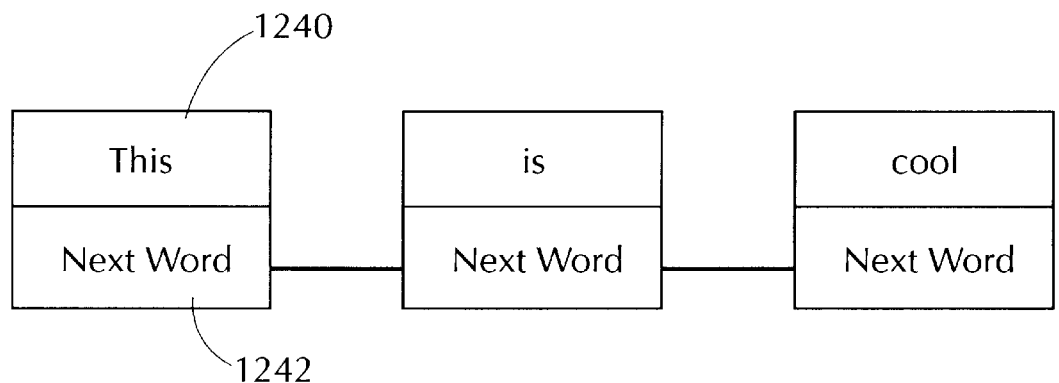
FIGS. 12B and 12C are representations of memory uses according to the present invention.
Figure 12C:
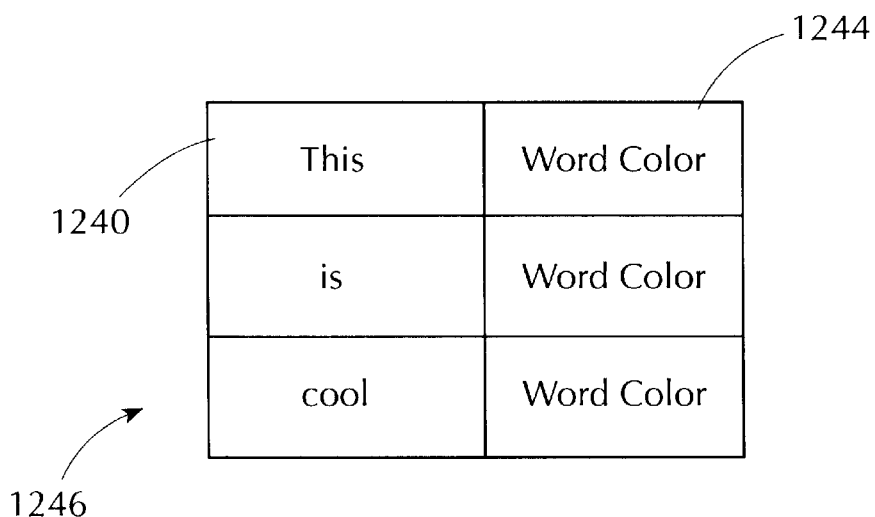

Referring to FIGS. 12B and 12C, the database used in the preferred embodiment will now be described. As discussed in the Background with reference to FIG. 12A, the prior art visual search application makes poor use of RAM due to the creation of a memory index of all words in the document.

The preferred embodiment can run in relatively low memory while maintaining performance. This is achieved without the indexes or data sets used in the prior art. No "memory index" is used whereby each word must contain a memory structure detailing color and additional information in addition to the word itself (See FIG. 12A).

Referring to FIG. 12B, the corresponding color associated with selected words 1240 is not stored with each occurrence of the word. The only data structure associated with each word 1240 is a pointer 1242 to the next word in the text. The color associations 1244 are instead stored in a query database within memory 1246 also known as a look-up table as shown in FIG. 12C. The application can reference the look up table 1246 to determine any association between a query (or word) 1240 and its associated colors 1244. Using the query database 1246, the application renders the colors though continuous searching.

Every time the state of the application changes, i.e., a new query is added, retracted, or edited, a search and match process occurs. As the document is searched each word within the document is checked against the database 1246 of queries. Words matching with a query stored in the database are color marked on the CRT screen according to the appropriate corresponding color. This is described with reference to FIG. 10.

This method of continuous search of the database and update of the screen also allows for changing source information to be incorporated into the user environment, providing the capability for real-time search. This is due to the dynamic nature of the search mechanism and also that this mechanism automatically updates the screen based on any change within the application environment. The embodiment thus has the capacity for handling real-time information feeds.

As noted above, the prior art requires a substantial amount of memory to process a single document. Thus, for example, a 4 MB document processed using one prior art visual search application requires approximately 100 MB of RAM. Furthermore, since processing of multiple documents require running multiple copies of the application, two 4 MB documents would require 200 MB, three 4 MB documents would require 300 MB, etc.

In embodiments of the invention however, since continuous searching is used, memory requirements are substantially reduced. In fact, in one embodiment, the memory requirements are merely the size of the document plus a substantially fixed amount about the size of the application described in connection with the invention.

In one embodiment, the memory requirement for the application is about 1 MB or so. Thus, processing of the same 4 MB document described above would require about 5 MB. As is now readily apparent, this is a substantial savings in memory space.

Furthermore, processing of multiple documents becomes more memory efficient, because two 4 MB documents would require only about 9 MB of RAM, three 4 MB documents would require only about 13 MB of RAM.

Of course, depending upon the features programmed into the application, the substantially fixed amount to be added would change, but the benefits would not be lost (i.e., if the application grew from 1 MB to about 5 MB, the processing of a 4 MB document would require about 9 MB of RAM and the processing of three 4 MB documents would require about 17 MB).

Figure 2A:
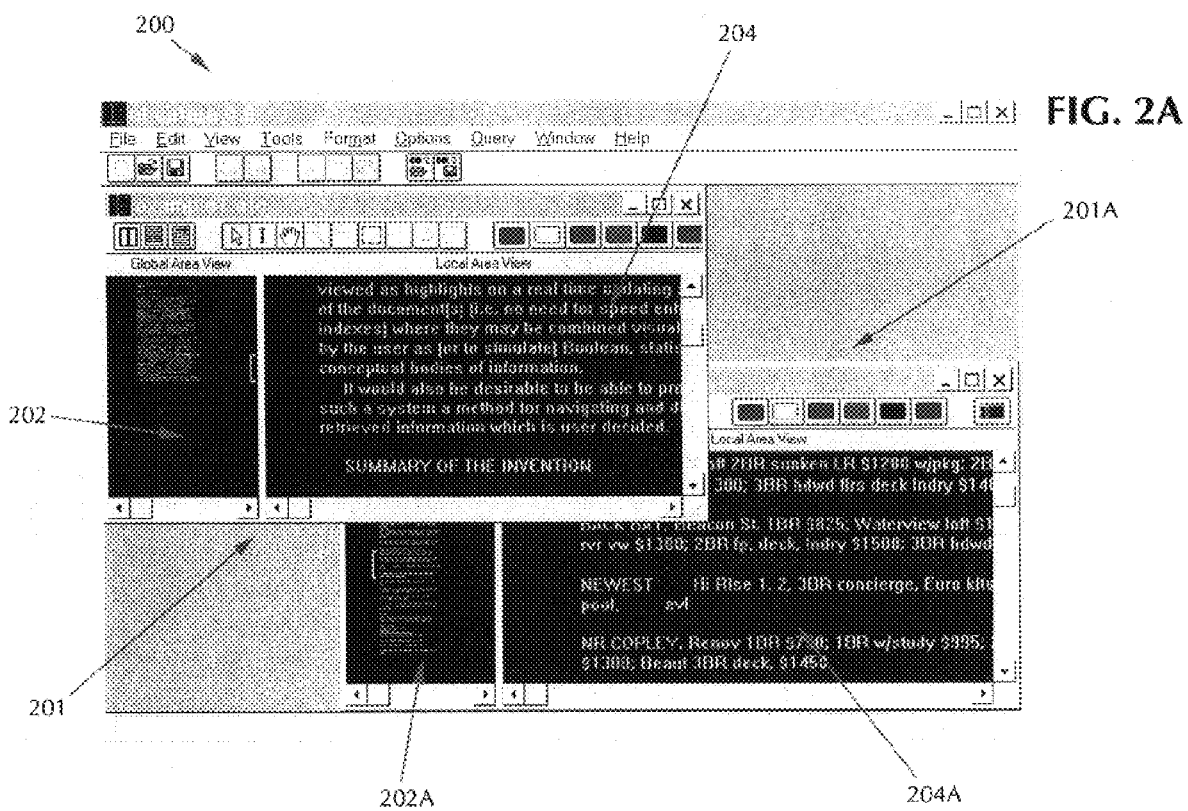
FIG. 2A is a representation of a portion of a computer display showing various regions defined thereon according to the present invention.

The system has the ability to handle multiple documents within a single application framework. If a user currently has a single document open as shown in FIG. 2, the user can open a second document (and a third, etc.) by selecting the open file button 218a or the open command from the menu bar under the "file" heading 216a. As shown in FIG. 2A, upon opening another document to search, the new document will be displayed in its own view window 201a. The user can display one or more view windows 201, 201a in a "tiled," "cascaded," or other manner as is known in the art. This may be done using the "window" menu 216f on the menu bar 216. The user may also view only one window 201 at a time if so desired. In the case of analyzing multiple documents, the user may desire easy capability to perform this action without expending unneeded performance and memory strain on the computer and operating system. In one of the prior art search applications described in the background, for each document to be analyzed a new instance of the program had to be run. In the current embodiment any number of documents can be opened and viewed within the a single instance of the program running.

In an alternative embodiment, the system could provide more than one GAV pane in the view window and/or more than one LAV pane in the view window. For each LAV pane, there should be a corresponding Zoombox within each GAV.

Figure 13:
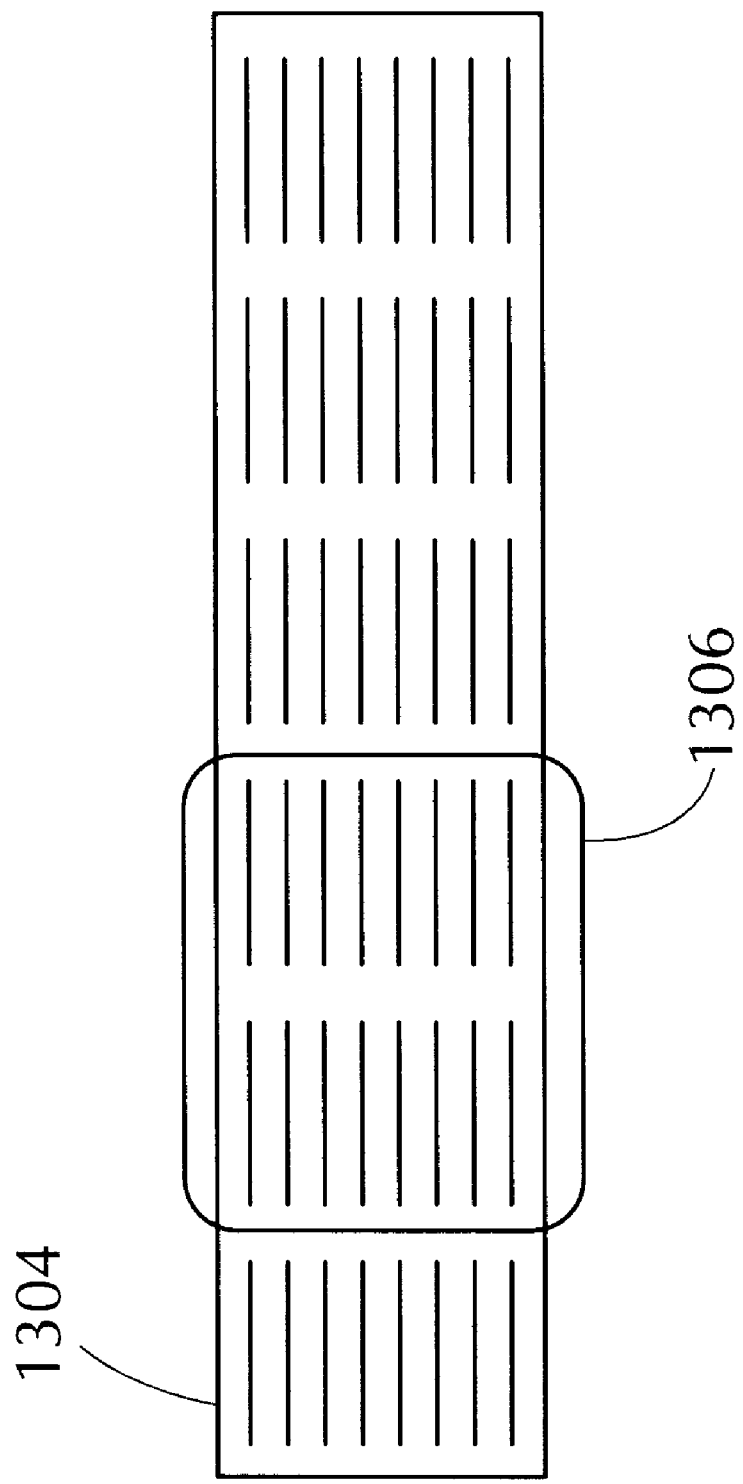
FIG. 13 is a representation of a cache according to the present invention.

The current embodiment also contains a means for caching the screen output of the documents map 205 for the purpose of enhancing usability and increasing performance of screen redraws within the application. It is necessary to have enough of the document or documents being analyzed available for viewing so that if the user chooses to view adjacent areas of the document map, these areas can be shown immediately. Referring to FIG. 13, contents of a cache 1304 in the form of data are stored for display on the screen. The area of the cache currently being displayed on the screen is indicated by 1306. As a user progresses through the document (or document collection) additional areas of the cached document can be rendered prior to the user reaching those areas. In another embodiment, in an environment where multi-threading is available, these other areas could be threaded and rendered in the background while the user interacts with the application in the foreground.

The embodiment also has the ability to save user queries to a file. Queries can be saved in a master list in which all queries and their corresponding colors are saved (i.e. the database or look up table is saved) as its own file. This can be accomplished by selecting the "save query" command from the "Query" menu 216b on the menu bar 216. Additionally, it is possible to save specific color categories of queries. This is accomplished by selecting the "save sub-list" command under the "Query" menu 216b on the menu bar 216 and then choosing the appropriate color category to be saved. Both features are included for the user who desires to explicitly save an entire query listing or category only. This can be accomplished by choosing the Save Queries button which is the second to last button on the Application Button Bar 218. The purpose of this feature may be to apply large query listings or categories to other open documents within the framework so that the user does not have to continuously input lists of large queries manually into multiple documents. This feature can also serve to detect revisions made to a document over time, by allowing a user to load in a complete document as a query list. To retrieve a query list or selected colors previously saved the user chooses the "Load Query List" command or the "Load Sub-list" command and chooses the appropriate color, respectively, from the Query Menu 216b on the menu bar 216. This can also be accomplished by choosing the Load Queries Button which is shown as the last button on the Application Button Bar 218.

As mentioned above, the preferred embodiment provides a way to mark points of interest within a document through "excerpting." Excerpts, 244, 244a as shown in FIG. 2, indicate a selected portion of text that the user wishes to mark for any of a number of reasons. Updates to excerpts, like queries, are reflected immediately, via the same automatic updating technique, on the GAV 202 of the document or documents. With respect to both queries and excerpts on a document(s), all markings made to any document may be saved with the document itself in a new file. This is accomplished by the user selecting the "Save" command under the "File" menu 216a or by pressing the Save Button which is the third button, with a floppy disk icon on the Application Button Bar 218. The unique nature of how the document is saved is that it does not overwrite the original documents. All markings and the document are saved in a single new file named by the user, under a proprietary file format. This is to ensure that there can b e no loss or separation of the specific queries or excerpts from the source information. This is accomplished by essentially saving the look up table with a copy of the original document for the first save executed. For saves thereafter, changes in a file or files that are already in the proprietary file format are overwritten to that file.

Figure 14A:
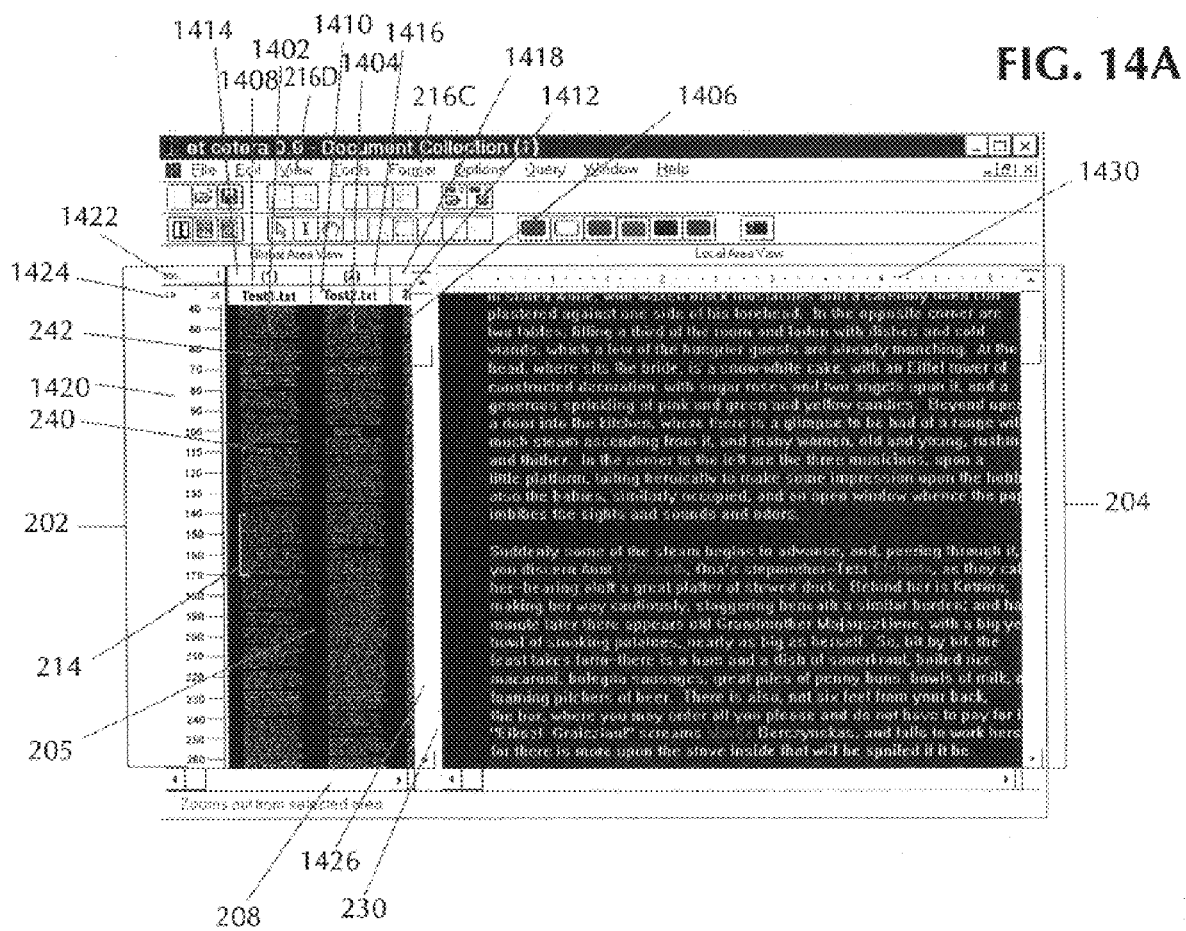
FIGS. 14A, 14B and 14C are representations of portions of a computer display showing various regions defined thereon according to the present invention.

Referring to FIG. 14A, in another embodiment, to view multiple documents, multiple columns may be provided in the GAV 202. FIG. 14A is similar to FIG. 2 except that the GAV 202 displays multiple documents 1402, 1404, 1406 in multiple columns. Each document has a header showing the file name 1408, 1410, 1412 and an additional header for document order 1414, 1416, 1418 within the view. The LAV 204 displays the text represented by the Zoombox 214 in a similar manner to FIG. 2. In addition, a ruler 1430 is provided in the LAV 204.

Each column in the GAV 202 contains a different document as indicated by the headers 1408, 1410, 1412 and the document order numbers 1402, 1404, 1406. In addition a line meter 1420, is provided in the GAV 202 which indicates the lines of text displayed in the GAV. For example, in FIG. 14A, the Zoombox 214 is shown as being located between lines "140" and "170" on the line meter 1420. Thus, the text in the LAV 204 is between these lines in the actual text. Also provided is a DOC (or document) indicator 1422 and a LN (or line) indicator 1424. The DOC indicator 1422 indicates the current document being viewed in the GAV 202 ("current document") upon which the Zoombox 214 is located. The LN indicator 1424 indicates the line number of the first line of the current document viewable in the GAV 202. Alternatively, the LN indicator could show the line location of the Zoombox 244.

The GAV 202 also has a horizontal scroll bar for use when there are more documents in the documents map 205 than can fit on the current GAV display area. For example, the third document 1418 in FIG. 14A is partially obscured. To view this document in the GAV 202, the user can use the right arrow on the scroll bar 208 to bring the document within view. Alternatively, the user could move the border 230 between the GAV 202 and the LAV 204 as described above with reference to FIG. 2. The vertical scroll bar 1426 can be used to view Micro-text in the GAV 202 which is not visible (because the document is too large or long).

A user may select which document is displayed in the LAV 204 by moving the Zoombox 214 as described above with reference to FIG. 2. Therefore, if the user wants to view the text in column 2 1416 on the LAV 204 the Zoombox may be moved to column 2 1416 in the GAV 202.

In the embodiment of FIG. 14A, when a user wants to view only a single document in the GAV 202, the user can double click the header areas 1408, 1410, 1412, 1414, 1416, 1418. This would cause the GAV to display the selected document only, in multiple columns as shown in FIG. 2, except with the header and document number remaining. To revert back to displaying the multiple documents, the user double clicks the header of the single document being displayed.

Figure 14B:
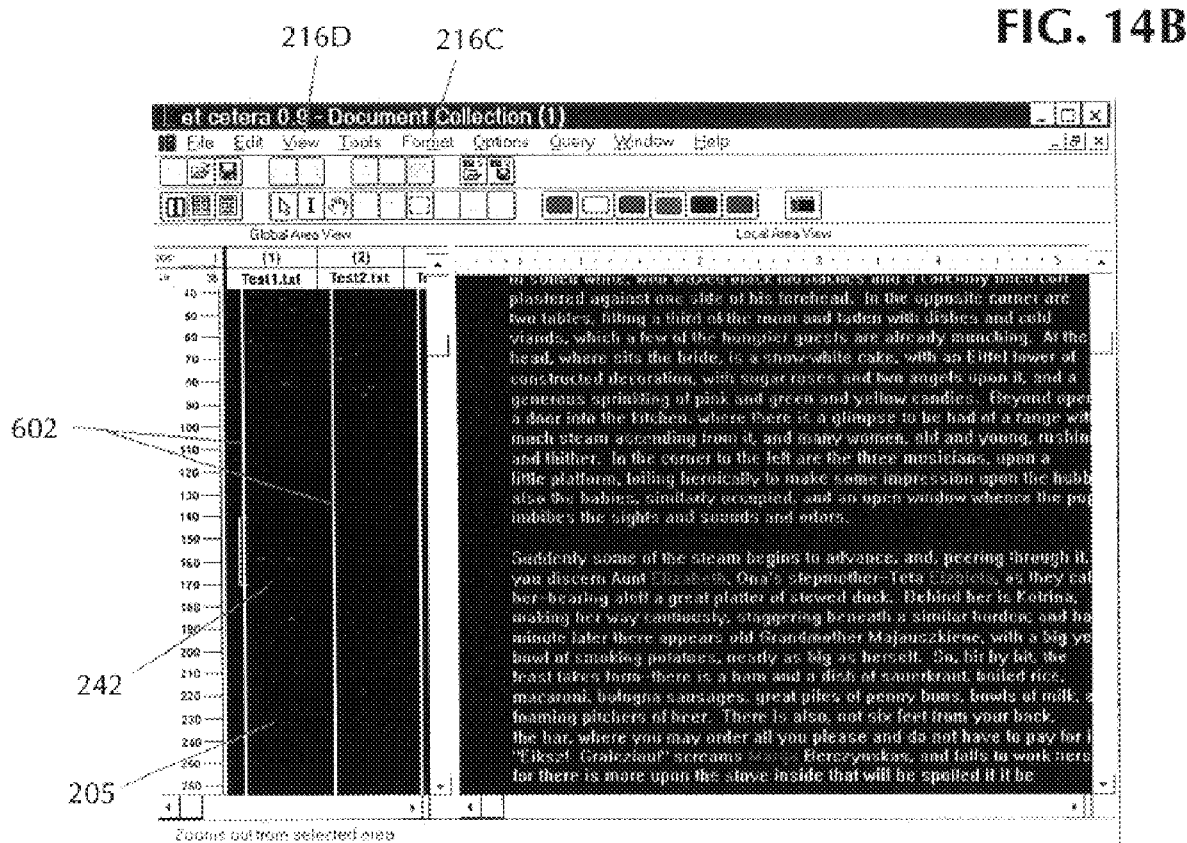
Figure 14C:
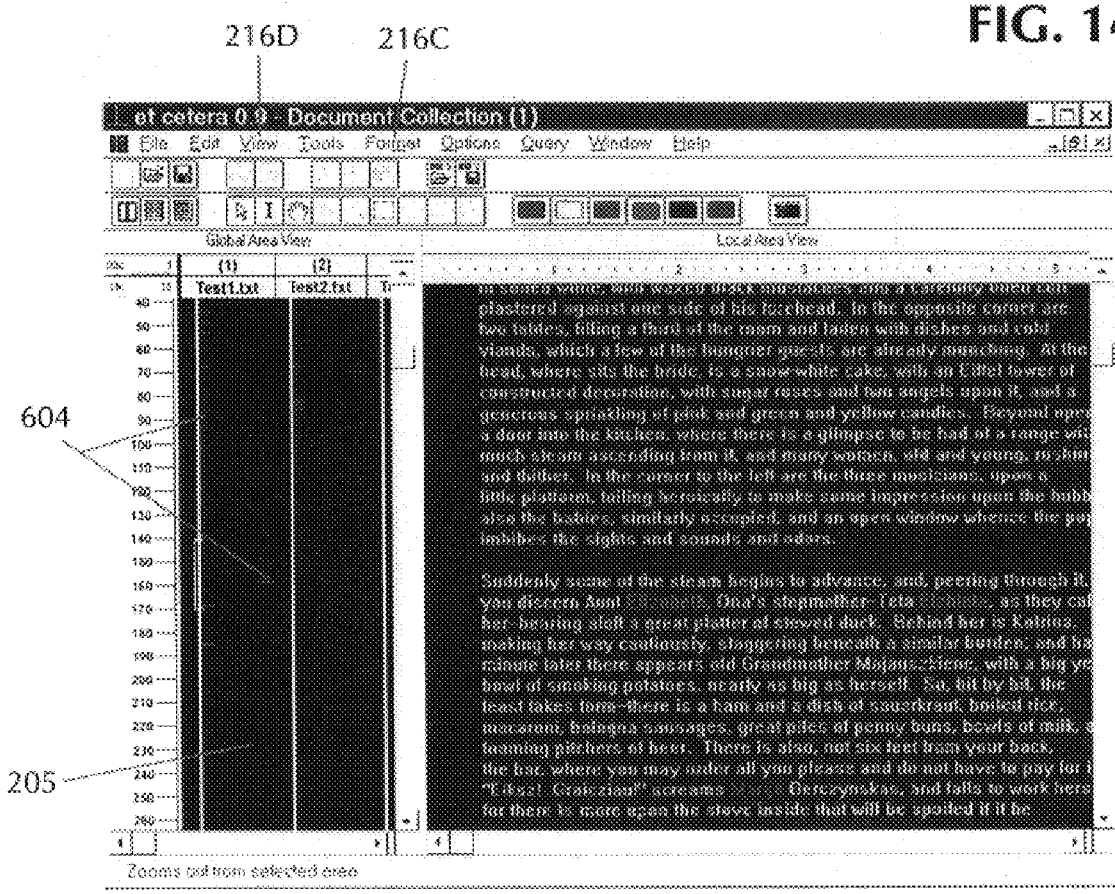

FIGS. 14B and 14C are diagrammatic representations of the application program showing the various manners in which the Documents Map 205 shown in FIG. 14A may be manipulated. Each of these manipulations is also known as "display states" described and shown in FIGS. 6A, 6B and 6C. Each display state focuses on the display of specific items contained within the Documents Map 205.

In FIG. 14A the application is set to the default display state of the Documents Map 205 where Micro-text 240 Matches 242 and Excerpts are displayed. FIG. 14B is similar to FIG. 14A except that the Micro-text is "hidden" (or not displayed), making the Matches 242 more visible. This view includes column delineators 602 which indicates the left margin marker of the hidden Microtext.

FIG. 14C illustrates the effect of a more abstract display state on the Documents Map 205, called "Queries Only". This allows the user to view the line markers 604 that indicate line locations of Matches but not their exact location within each line. In other words, the line marker 604 merely indicates which line a Match is on but not where (from a left and right perspective) the match is situated on the line. The line marker also indicates the associated color of the Match. This is a useful display state when there are a very large number of queries per category and locating points of interest becomes too difficult using the default display state. It is also useful to differentiate Matches when there are a number of queries which "collide" or overlap. The two display states shown in FIGS. 14B and 14C can be invoked through menu commands. For the state shown in FIG. 14B, a user selects the format menu 216C from the menu bar, and selects "display." This brings up a dialog box which allows a user to choose via "check boxes" microtext, queries, and excerpts to be displayed or not. The state in FIG. 14C is changed by the "Queries Only" command under the "Display State" submenu under the "View Menu."

In other respects, the embodiment shown in FIG. 14 is as described for FIG. 2. The application program will preferably have a window (or window pane) dedicated to showing the database of queries that the user has created in some format, preferably as a listing of the queries sorted into their respective categories. This would be the same as the query window 300 shown in FIG. 3.

Figure 15:
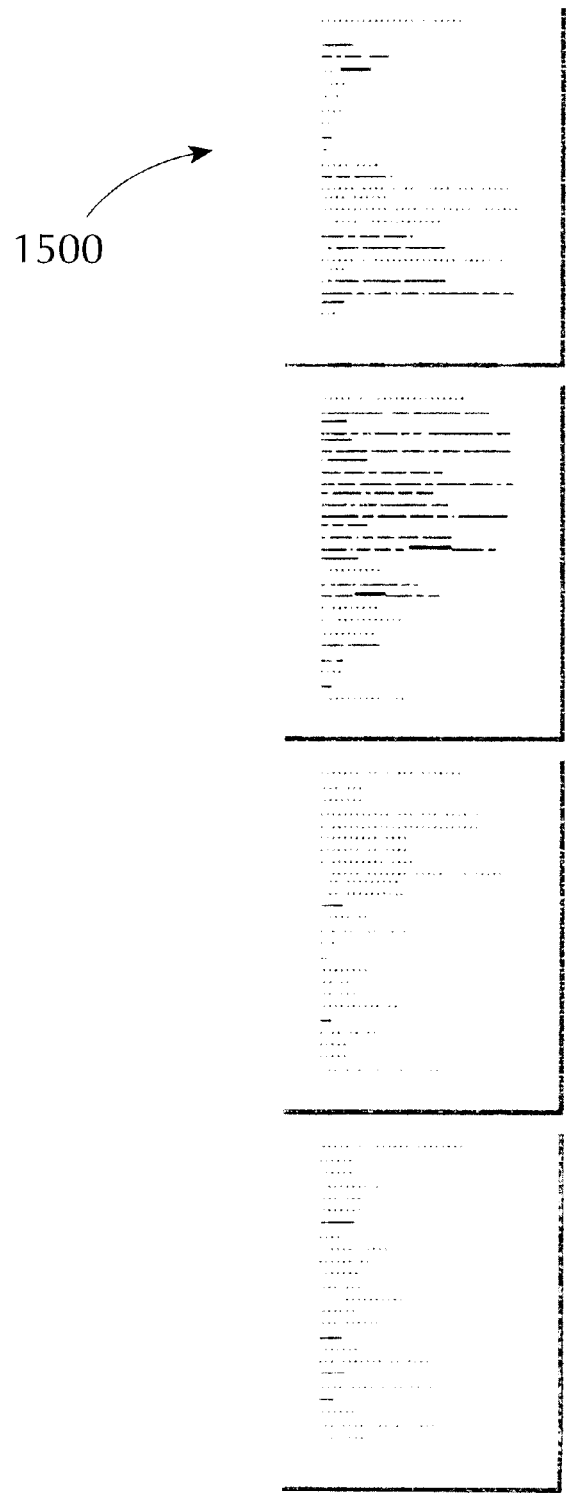
FIG. 15 is a representation of a method of displaying text on a portion of a computer display according to the present invention.

Although the display of information in the GAV has been described in the embodiments as continuous columns of Micro-text, this information may also be presented in a thumbnail version of a formatted page layout as shown in FIG. 15.

The current embodiment of the invention performs activities serially. However, in another embodiment, the system could perform activities in parallel. An example of this would be taking a large document or body of documents and splitting up the information into small equivalent parts, each to be searched within the same time period (i.e., in parallel) by its own individual search process. An alternate slight variation on this example would be when viewing a number of documents the application would use separate processes for performing activities on each document. These processes could be performed at the same time (i.e., in parallel). This is commonly known as "threading" processes and is popular in today's "true" multitasking environments.

Figure 16A:
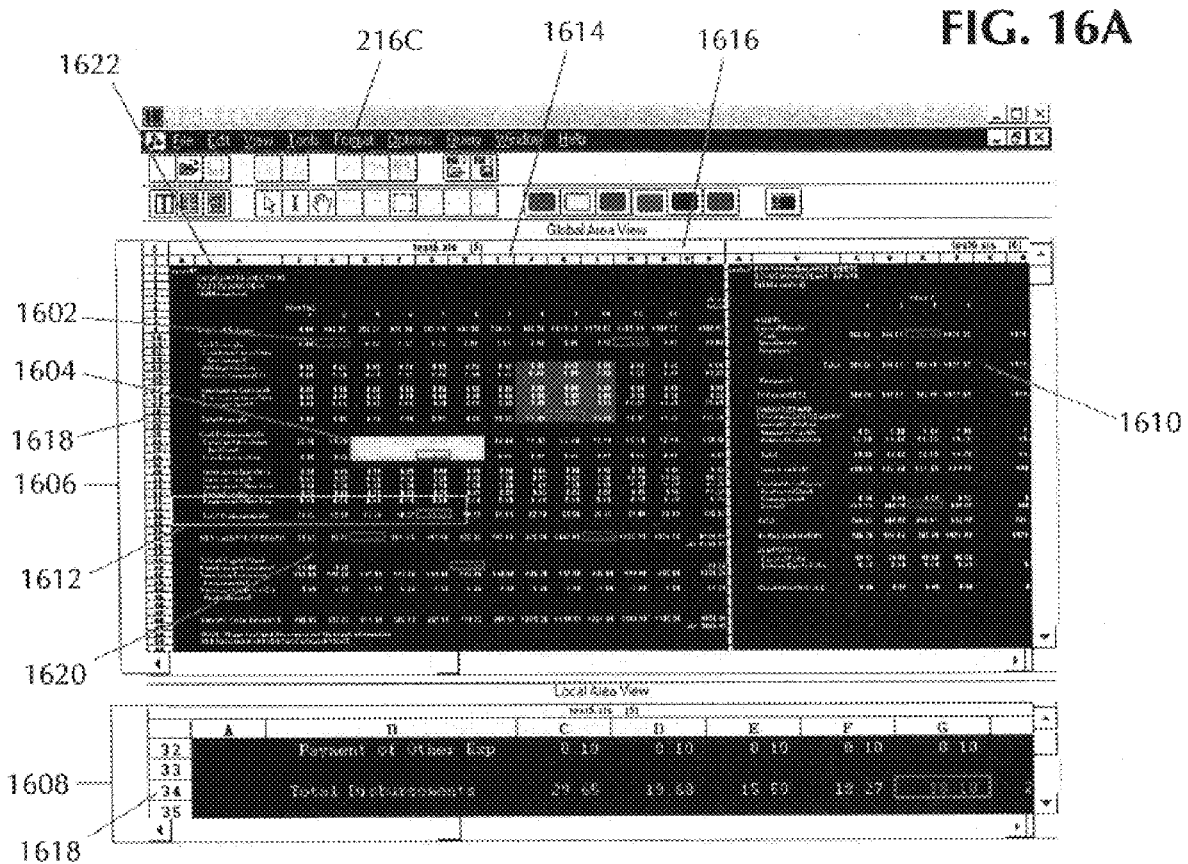
FIGS. 16A and 16B are representations of a computer display showing various regions defined thereon according to the present invention.

Further embodiments of the present invention could be applied to other types of digital media other than text such as spreadsheets, graphics, audio, video, 3d environments and databases. FIG. 16A illustrates spreadsheets being searched with an embodiment of the application. Query matches 1602 are represented by a color cell border and colored text. Excerpts 1604 are represented with solid background cell colorings. As with text viewing, there is presented a global area view 1606 and a local area view 1608. In addition, as shown in FIG. 16A, more than one document can be displayed in the GAV 1606. Indeed, as shown in FIG. 16A and 16C the second document/spreadsheet 1610 is being partially displayed. The Zoombox 1612 is an actual box that surrounds the text displayed in the LAV 1608. Cell headings for each of the columns in the spreadsheet 1614 are presented below the filename headers 1616 for each document in the GAV 1606. Row numbers 1618 are also provided in both the GAV 1606 and the LAV 1608.

Figure 16B:
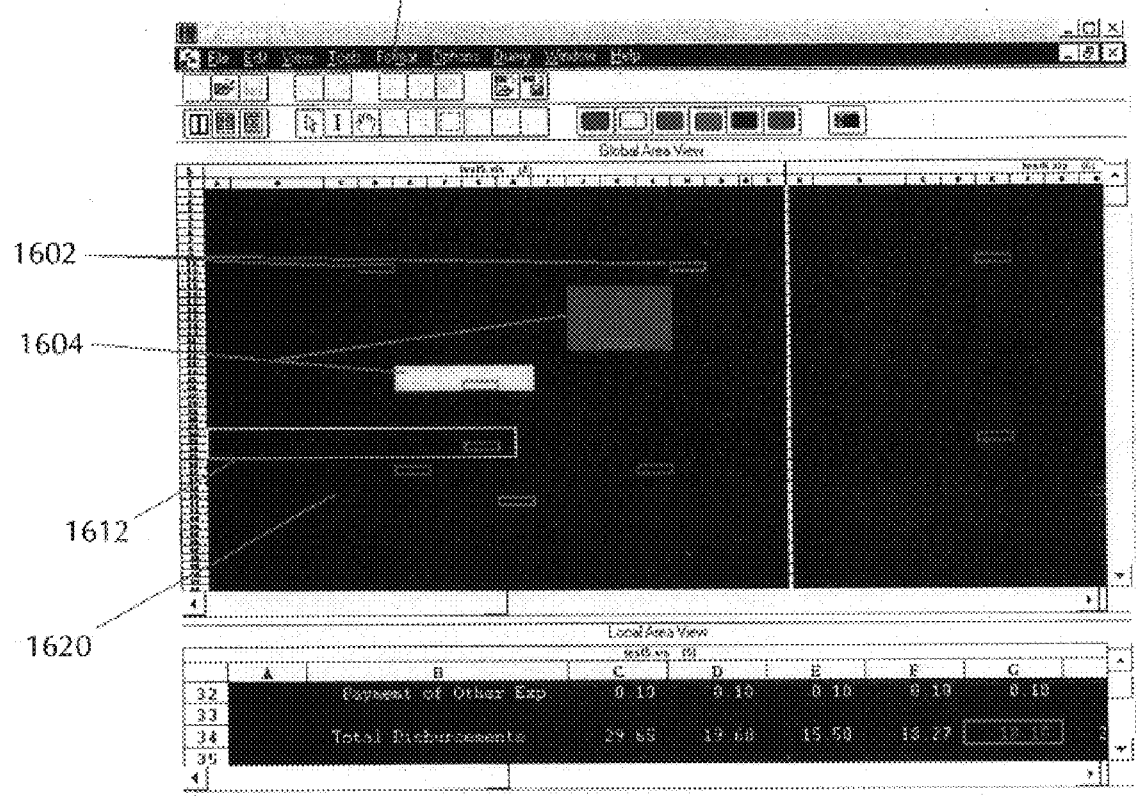

FIG. 16B is a diagrammatic representation of the application program showing another manner in which the Documents Map 1620 shown in FIG. 16A may be manipulated. This is known as a "display state." In FIG. 16A the application is set to the default display state ("Normal" display state) of the Documents Map 1620 where all information: Micro-text 1622, Matches 1602, and Excerpts 1604 are displayed. FIG. 16B is similar to FIG. 16A except that the Micro-text is "hidden" (or not displayed), making the Matches 1602 and excerpts 1604 more visible. This state and other display states for FIGS. 16, concurrent with those discussed in FIGS. 6, can be activated in the same manner as the display states shown in FIGS. 6A, 6B and 6C.

In other respects, the attributes of the embodiment shown on FIG. 16A are the same as those in FIGS. 2 and 14C.

Figure 17A:
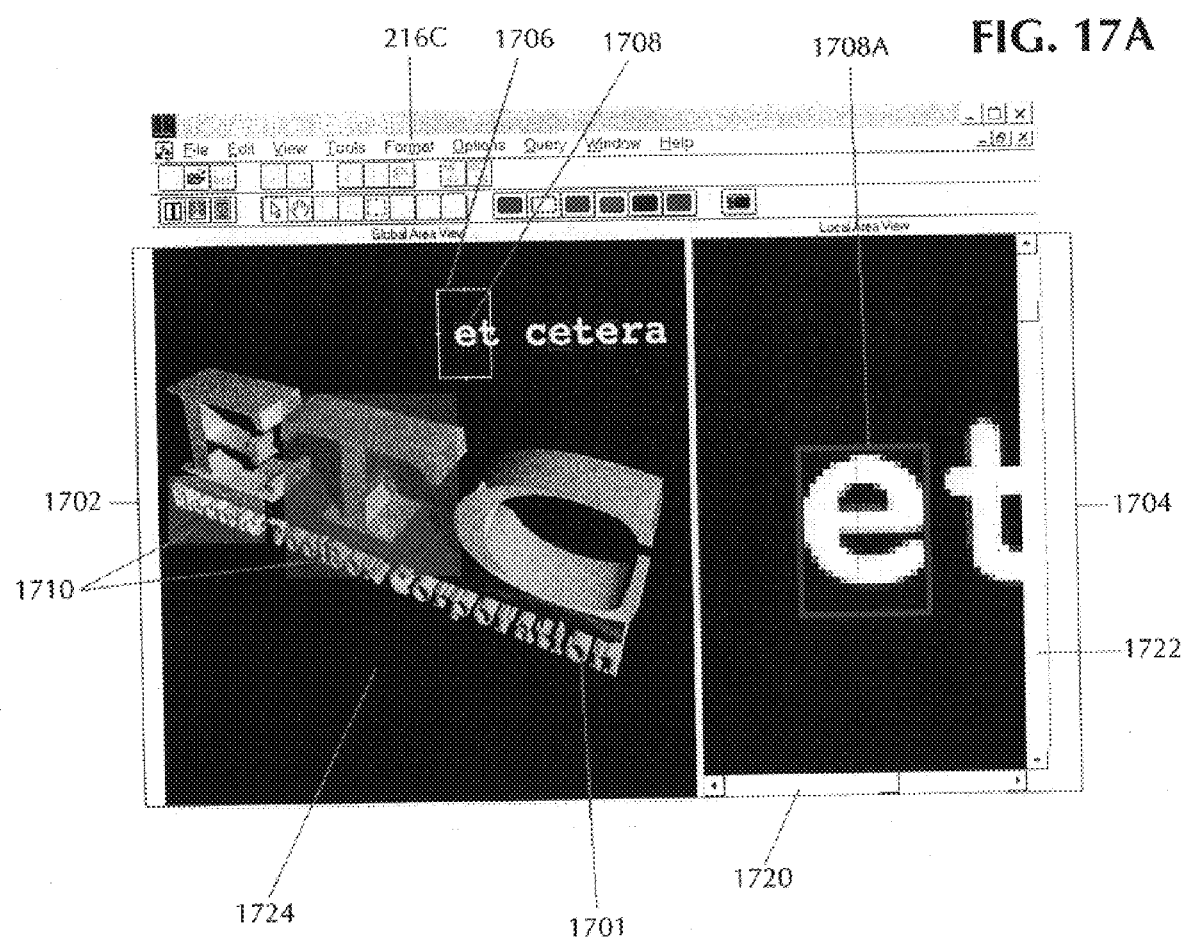
FIGS. 17A and 17B are representations of a computer display showing various regions defined thereon according to the present invention.

A further embodiment provides the ability to view multiple graphics files in a global area view/local area view format. Referring to FIG. 17A, the GAV 1702 displays a shrunken view of a graphic while the LAV 1704 displays the full size view. The Zoombox 1706 appears as a box surrounding the area representing the information displayed in the LAV 1704. "Matches" (query search results) are represented by colored outlines of boxes 1708, 1708A. Excerpts 1710 are represented as colored shaded areas. Horizontal and vertical scroll bars 1720, 1722 are provided for displaying different areas of the LAV 7704. This can also be accomplished by moving the Zoombox 1706.

Figure 17B:
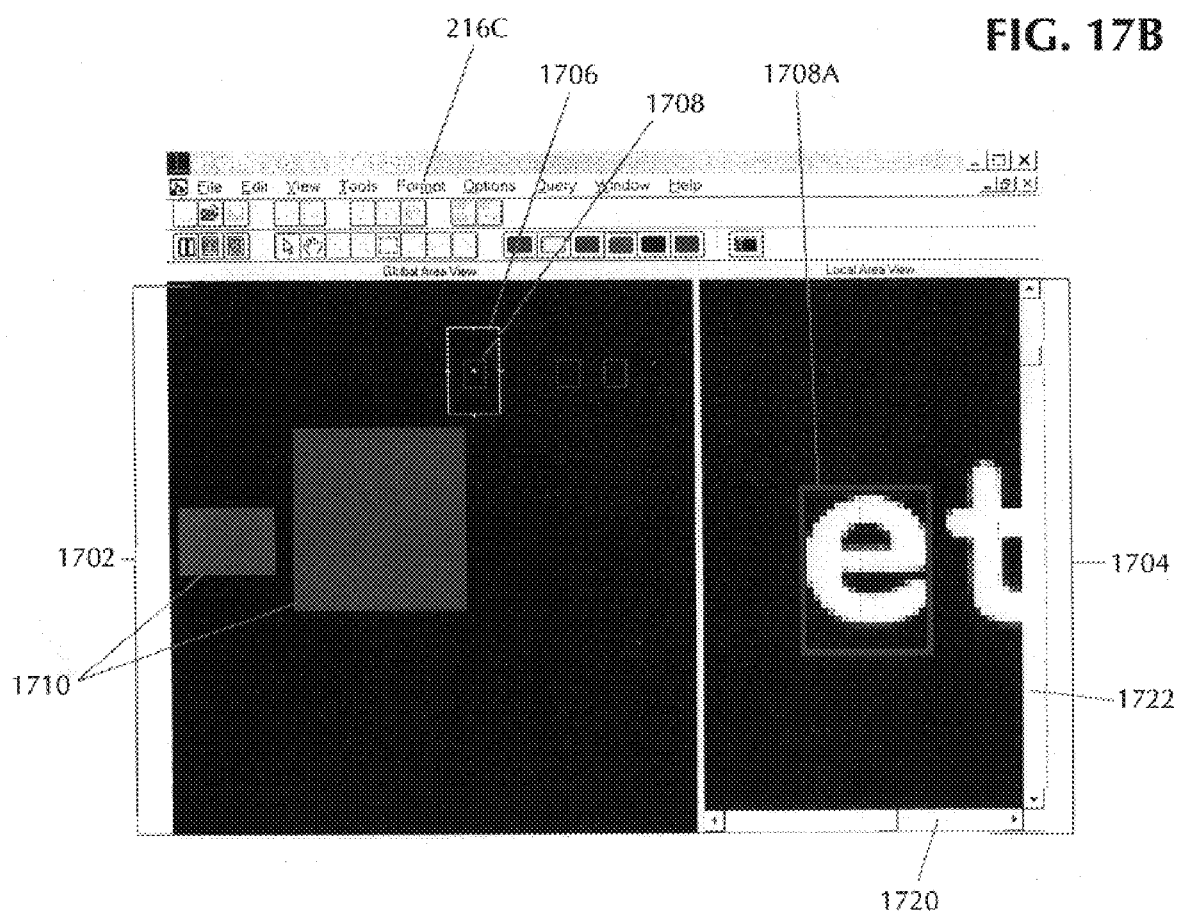

FIG. 17B is a diagrammatic representation of the application program showing the various manners in which the Documents Map 1724 shown in FIG. 17A may be manipulated. This manipulation is known as a "display state." The display state focuses on the display of specific items contained within the Documents Map 1724.

In FIG. 17A the application is set to the default display state ("Normal" display state) of the Documents Map 1724 where all information: the graphics 1701, Matches 1708, and Excerpts 1710 are displayed. FIG. 17B is similar to FIG. 17A except that the graphic is "hidden" (or not displayed), making the Matches 1708 and Excerpts 1710 more visible. These "display states" can be invoked in a manner similar to FIGS. 6A, 6B and 6C as appropriate for graphics.

Further embodiments could have the ability to handle multiple media. These media may be split up into seven differing categories: text, graphics, spreadsheets (or tables), audio, video, 3D or virtual reality ("VR") environments, and databases (which may contain any of the above categories in combination with each other).

It is acknowledged that the capability for specific types of searches may not exist, however it is important to recognize that it is conceivable that one day these capabilities may exist and therefore may be eligible for use with the disclosed embodiments. It is therefore necessary to delineate for purpose of example, and not limitation, the potential capabilities for searching the media mentioned. These search capabilities may be either syntactic, based on patterns or rules within a document environment, or semantic, based on interpretation of information found within a document environment.

Text information provides many different manners for finding information, each with a distinct result. The following gives examples of text search capabilities. Boolean search is popular due to its rule based efficiency for finding keywords with specific rule based proximities to each other. More complex methods of searching text include searching the stems of words, or searching whole phrases, sentences or text bodies for exact or similar matches. Recently, context searching has become popular for finding target information that may not contain specific keyword references to that information. Searching for misspelled words, synonyms to keywords, and homonyms to keywords are capabilities desired by users who need to extract more abstract pieces of information. In the future it is conceivable that pronoun resolution, the ability to match a pronoun with its subject matter, will be possible, however this is a semantic based search which requires a great deal of sophistication in the algorithms which make such decisions and, as of yet, it is not known whether such a technique has been perfected.

Spreadsheets are number oriented and have no generally accepted manner for search and retrieval of information, except with respect to text within a spreadsheet, which would fall under the domain of regular text search as discussed above. However, using the invention some unique opportunities for finding information exist. Algorithms that search by cell value may be useful in establishing constantly recurring values, while searching by cell formula (cell equation) accomplishes the task of finding information derived in similar manners (i.e. the value of employee fringes and benefits may be calculated with the same equation, but the actual values for it may change each month—therefore it is not capable of being searched by value, but it would be capable of being searched by equation). The ability to search by context with reference to specific activity within a spreadsheet (i.e. the quarterly results on a balance sheet that have some specific significance). The invention may also provide for a means of excerpting areas of spreadsheets as a delineation of points of interest.

Current search capability in the area of graphics is limited. Graphics search is conducted through methods using sophisticated pattern recognition algorithms.

With respect to audio, sheet music may be treated as a language of text, and therefore may be subject to those searching mechanisms usable on a body of text. The searching of sound waves, is a further extension of the search of patterns.

With respect to digital video, the base mechanism for search could come from graphics search capabilities. This is due to the fact that digital video is essentially a sequence of frames of graphics. The end result is that digital video is subject to much greater performance obstacles due to the number of frames even in the smallest video segments. However, it is conceivable that video search can be accomplished for a film through the use of video/text transcript correspondence algorithms. Such a method matches up words spoken in a film with their respective frames. A user searches for a scene in a film by querying the transcript. The results of a search are all of the frames which correspond to the timing of all instances of that word (or phrase, etc.) being spoken within the film (the result would be multiple frames because video is usually 15 frames per second or greater).

Three dimensional ("3D") environments allow for search on the level of characteristics of objects within the environment. Such searches can consist of mechanisms for finding the appropriately shaped, sized, or colored object. An example environment where such search could be used is a VRML (virtual reality markup language) rendered environment. Additionally, location is an element that may be searched on both a syntactic level (as in a coordinate point) or on a semantic level (the name of a place).

With respect to audio, video, and 3D, these media could be searched and viewed in environments similar to those presented for text, spreadsheets, and graphics.

Databases are the all encompassing medium. They may contain any of the above mentioned mediums. Therefore databases may be searched using the mechanisms, as defined above, that are appropriate for those media which reside within the records of that database. Additionally, database records could be searched and viewed with all records shown within a Global Area View setting and closer analysis of each record could occur through a Localized view (or Local Area View) of records which are of interest to a user.

Additional alternative embodiments may employ various combinations of the aforementioned features, as well as features such as the following: the ability to focus on a specific category or categories of queries (to view only specific colors of queries); the ability to load multiple documents into a singular combined document; the ability for the user to sort documents within document collections by grabbing on a header bar and moving the document to the desired location; the ability for visual query submission and document excerpting within both GAVs and LAVS; the ability to add and edit documents for real-time information "feeds" and data editing, the ability for user delineation of interface preferences such as categories titles, number of categories, category colors; the ability to select data from either a GAV or LAV for copying, cutting, and pasting; the ability for use on foreign languages; the ability to alter the brightness of the color of related results to a keyword (more relevant results are brighter less relevant results has are not as bright, though all results are of the same general color, i.e. brightness alteration of red, green, etc.).

Additional embodiments may further provide for selection of text and graphics for copying and pasting into other applications. Of general importance is the ability to grab screen shots of the global map of a document or documents, as well as grabbing information found to be of interest through the querying of the document. The application provides the ability to select graphic images for copying and pasting into other applications.

It should be appreciated that in alternative embodiments, documents or files containing multiple media could be processed using the search and retrieval algorithms specific to each medium as discussed above. The nature of the invention is to seamlessly provide search capability across these media without the user having to manually switch from searching one type of medium to searching another, i.e., a user may search text and then search graphics with the application automatically handling the specific queries with the appropriate search algorithms. This would be accomplished by the application being able to recognize objects (text, graphics, other media) within a document. There are many known search algorithms which perform searches on many types of media, i.e., there are many different ways to accomplish the same goal or results with respect to a search. For this reason, the invention need not rely on one specific algorithm for each type of search (i.e., Boolean search—doesn't matter which specific search algorithm is used as long as a user will be able to execute a Boolean search with the proper results), and in fact it is expected that different programmers may employ different algorithms. The invention should not be restricted to using one type of search algorithm. This is a decision to be made by the individual who implements the invention with the understanding that the invention will reflect the accuracy and capability of the search algorithms chosen.

It should be appreciated that operating environments with sophisticated characteristics such as preemptive multitasking and multi-threading may also be used with the invention. Within such environments it is expected that any implementation of the invention will make use of these mechanisms to enhance overall performance of the application. Specifically, with respect to finding information within large documents or document collections, instead of searching such bodies of information in a linear or serial manner, meaning beginning to end of a document or first document to last document within a collection, the body or bodies of information to be searched may be split up into smaller parts which may be searched more easily, more quickly, and most importantly in parallel.

Such functionality would also be capable of allowing the application to perform many seemingly inconsequential tasks in the background without holding up the user by halting the execution of other, possibly more important, application processes. These methods further enhance the real-time functionality of the invention.

The possible capability for real-time information feeds cannot be underestimated. This functionality would allow the application to respond to sources of new information from outside of the application, with the ability to append, include, or overwrite information appropriately depending on the scenario. The application may note any change in the status of the application environment, induced by interaction with the user or another catalyst uncontrolled by the application, and updates all source information and markings accordingly.

Through use of the caching technique and multithreading ability mentioned previously, the invention could further provide for a means of utilizing a finite amount of Random Access Memory to analyze any number of documents, large or small, of any media. This could occur through a two stage caching process whereby both RAM and hard disk storage would act as buffers for relevant screen information. RAM would be the priority stage buffer holding the most relevant information for processing and the hard disk would be the secondary stage buffer which would feed the RAM stage buffer.

It is to be understood that the above description is only some of the preferred embodiments of the invention. Numerous other arrangements may be derived by one skilled in the art, without departing from the spirit and scope of the invention. The invention is thus limited only as defined in the accompanying claims.

What is claimed is:

1. A visual search and retrieval system comprising:
   at least one viewing window provided on a screen;
   a first pane within the viewing window providing a scrollable global view of digitally stored information;
   a second pane within the viewing window providing a scrollable scaled local view of the digitally stored infomation, each of the global and local views being scrollable independent of the other;
   a database capable of holding entries selected from the digitally stored information and associated attributes representing colors;
   first indicia within the first pane indicating results of a search performed by associating a data item with a color; and
   second indicia within the second pane indicating, using the color, results of the search performed and corresponding substantially to the first indicia.

2. The system in claim 1 further comprising third indicia viewable in the first pane indicating substantially the scaled local view provided by the second pane.

3. The system of claim 2 wherein the second indicia and third indicia are interrelated so that the movement of the second indicia causes a corresponding movement of the third indicia.

4. The system in claim 2 wherein the third indicia is movable throughout the first pane.

5. The system in claim 2 wherein the third indicia comprises a zoombox.

6. The system in claim 1 wherein said first indicia is presented in the color.

7. The system of claim 1 wherein the digitally stored information provided in the first pane is displayable with a first user selectable magnification factor and the digitally stored information provided in the second pane is displayable with a second user selectable magnification factor.

8. The system of claim 7 wherein the first and second magnification factors are different.

9. The system of claim 8 wherein the second magnification factor is smaller than the first magnification factor.

10. The system of claim 1 wherein the first pane further comprises a documents map having user manipulable display characteristics.

11. The system of claim 1 further comprising a search engine wherein the search engine is constructed to process a query according to one of a keyword, a phrase, a Boolean, a conceptual, a statistical or a misspelled word search algorithm.

12. The system of claim 1 wherein the second indicia is displayable with a varying brightness corresponding to the relevance of the results.

13. The system of claim 1 wherein the digitally stored information comprises one of text, graphics, spreadsheets, tables, audio, video, 3D, virtual reality information or databases.

14. The system of claim 1 wherein the digitally stored information comprises multiple media.

15. The system of claim 1 wherein the digitally stored information in the first pane comprises text and the text is displayed as a thumbnail view.

16. The system of claim 15 wherein the thumbnail view is displayed as a column.

17. The system of claim 16 wherein a portion of the column is obscured from view.

18. The system of claim 16 wherein the the thumbnail view wraps from a first column to a second column.

19. The system of claim 16 wherein the column includes a header.

20. The system of claim 1 wherein the digitally stored information in the first pane comprises a plurality of documents and wherein each of the plurality of the documents is displayed in individual columns.

21. The system of claim 1 wherein the digitally stored information comprises multiple documents which are represented as a singular combined document.

22. The system of claim 1 further comprising a user input device for entering a query.

23. The system of claim 1 wherein the database has contents consisting essentially of queries representing the entries selected from the digitally stored information and colors associated with the queries.

24. The system of claim 23 wherein the second indicia is a visual representation of the contents of the database.

25. The system of claim 23 further comprising a processor capable of accessing the database by continuous searching.

26. The system of claim 25 wherein the processor is further constructed for responding to an input and modifying the contents of the database in response to the input.

27. The system of claim 25 wherein the processor can handle threaded processes.

28. The system of claim 27 wherein the at one viewing window is a first viewing window and the first viewing window is a first process, the system further comprising a second process having a second viewing window, a first pane within the second viewing window providing a global view of new digitally stored information and a second pane within the second viewing window providing a local view of the new digitally stored information.

29. The system of claim 25 wherein the processor further comprises means for continually searching the first process and the second process simultaneously.

30. The system of claim 27 wherein the digitally stored information comprises a first document running in a first process and a second document running in a second process.

31. The system of claim 30 wherein the processor further comprises means for continually searching the first process and the second process simultaneously.

32. The system of claim 23 further comprising a dialog box having elements, each of the elements being selectable using an input device, a first of the elements being capable of displaying a query and a second of the elements being capable of displaying colors so that in response to a selection of a color using the input device, the contents of the database will be updated to associate the selected color with the query.

33. The system of claim 23 further comprising a unitary save file, the unitary save file including the digitally stored information and the database.

34. The system of claim 1 wherein the first indicia is displayable with a varying brightness corresponding to the relevance of the results.

35. The system of claim 1 further comprising a query window.

36. The system of claim 35 wherein the query window includes a listing of queries represented by the first indicia.

37. The system of claim 36 wherein the listing of queries is sorted by color categories.

38. The system of claim 1 further comprising a search process for processing a first query according to one of a keyword, a phrase, a Boolean, or complex Boolean search algorithms and a second query according to another of a keyword, a phrase, a Boolean or complex Boolean search algorithms and for displaying a combined result thereof on the screen in the first pane.

39. The system of claim 38 wherein the first query is associated with a first color, the second query is associated with a second color and the combined result is displayed using an indicator different from the first and second colors when a first portion of the first query corresponds to a first portion of the second query.

40. The system of claim 39 wherein the indicator is a color.

41. The system of claim 1 further comprising a search application program, the search application program having a substantially fixed size and the database having a database size based upon a contents consisting essentially of previously selected queries and colors associated with the queries, and wherein the digitally stored information comprises a plurality of files, each of the files having sizes, such that the maximum storage requirements necessary for running the search application program on the digitally stored information is equal to the sum of the substantially fixed size, the database size, and the sizes of the plurality of files.

42. A visual search and retrieval method comprising the steps of:

a) displaying a global view of first digitally stored information within a first pane of a viewing window;

b) displaying a local view of the digitally stored information within a second pane of the viewing window;

c) maintaining a database capable of holding entries and associated attributes representing colors;

d) processing a query by adding an entry and an associated attribute representing a preselected color into the database; and e) responsive to the query, updating the global and local views to display the search result within the digitally stored information, using a first indicia in the preselected color, individually inside both the first and second panes.

43. The method of claim 42 further comprising the steps of:

scrolling through the local view in response to user input; and simultaneously displaying the digital information in the global view which corresponds to the digital data displayed in the local view.

44. The method of claim 42 further comprising running one of steps a) through d) using a first process.

45. The method of claim 44 wherein the running step is performed in the foreground.

46. The method of claim 44 wherein the running step is performed in the background.

47. The method of claim 44 further comprising the step of running one of steps a) through d) using a second process in the background simultaneous with running the first process.

48. The method of claim 42 further including the step of:

opening a second viewing window, the second viewing window containing two panes, a first of the panes being capable of displaying a global view of searchable digital information and a second of the panes being capable of displaying a local view of the searchable digital information, the searchable digital information being displayable in the two panes according to different magnification factors.

49. A threaded process visual search and retrieval system comprising:

a first process having a first viewing window including a first pane and a second pane, a second process having a second viewing window including a first pane and a second pane, a database consisting essentially of fields for queries and color indicators associated with the queries, and a processor for running the first and second processes, processing searches in response to queries, and for searching the database so that in response to a query, the processor will search the database and identify a color indicator associated with the query and display a result of the search in one of the first or second processes using the color indicator.

50. The method of claim 49 further comprising the step of providing at least one scrollbar in each of the first and second panes of each of the first and second viewing windows.

51. A system comprising:

a window including two panes, a first of the panes being capable of sequentially displaying a plurality of independent documents having headers, manipulable scroll bars associated with each of the two panes, the scroll bars each being configured to respond to a user input so that when a scroll bar is manipulated in either of the first pane or the second pane, documents and headers displayed within the pane can be strolled through the pane independent of the other pane; and a database configured to consist essentially of items of data and visually displayable attributes so that when a first item of data present in one of the plurality of documents is selected, a first associated attribute will be displayed at every occurrence of the first item of data in the two panes.

52. The system of claim 51 wherein the plurality of documents comprise a plurality of individual files.

53. The system of claim 52 wherein at least one of the plurality of individual files comprises a non-text file.

54. The system of claim 51 further including overlap detection and display means for identifying overlapping portions of selected items of data such that, when a second item of data present in one of the plurality of documents is selected and a second associated attribute is displayed at every occurrence of the second item of data in the two panes, and the first and second items of data share a spatial relationship such that there is a common overlapping portion of the first and second items of data, the overlap detection and display means will cause the common overlapping portion of the first and second items of data to be displayed differently than a non-overlapping portion of either of the first or second items of data.

* * * * *